United States Patent
Kawamoto et al.

(10) Patent No.: US 8,698,902 B2
(45) Date of Patent: Apr. 15, 2014

(54) COMPUTER-READABLE STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

(75) Inventors: Kouichi Kawamoto, Kyoto (JP); Ryusei Matsuo, Yamanashi (JP); Yuuki Nishimura, Yamanashi (JP)

(73) Assignees: Nintendo Co., Ltd., Kyoto (JP); HAL Laboratory Inc., Tokyo (JP)

( * ) Notice: Subject to any disclaimer, the term of this patent is extended or adjusted under 35 U.S.C. 154(b) by 261 days.

(21) Appl. No.: 13/053,836

(22) Filed: Mar. 22, 2011

(65) Prior Publication Data

US 2012/0075484 A1    Mar. 29, 2012

(30) Foreign Application Priority Data

Sep. 27, 2010   (JP) .................... 2010-215653

(51) Int. Cl.
| H04N 5/225 | (2006.01) |
| A63F 9/24 | (2006.01) |
| A63F 13/00 | (2006.01) |
| G06F 17/00 | (2006.01) |
| G06F 19/00 | (2011.01) |
| H04N 9/73 | (2006.01) |

(52) U.S. Cl.
USPC ..................................... 348/207.1

(58) Field of Classification Search
USPC ............................... 348/207.1, 239
See application file for complete search history.

(56) References Cited

U.S. PATENT DOCUMENTS

| 6,987,535 B1 * | 1/2006 | Matsugu et al. ............... 348/239 |
| 2002/0075286 A1 * | 6/2002 | Yonezawa et al. ............ 345/679 |
| 2004/0183926 A1 * | 9/2004 | Fukuda et al. ................ 348/239 |
| 2007/0236510 A1 * | 10/2007 | Kakuta et al. ................. 345/632 |
| 2009/0109240 A1 * | 4/2009 | Englert et al. ................ 345/633 |
| 2009/0190003 A1 * | 7/2009 | Park et al. ..................... 348/239 |
| 2011/0090343 A1 * | 4/2011 | Alt et al. ....................... 348/164 |
| 2011/0096190 A1 * | 4/2011 | Silverstein et al. ........ 348/223.1 |
| 2011/0298823 A1 * | 12/2011 | Kitahara ...................... 345/632 |
| 2012/0113228 A1 * | 5/2012 | Konno et al. ................... 348/47 |

FOREIGN PATENT DOCUMENTS

JP    2003-256876    9/2003

* cited by examiner

*Primary Examiner* — Sinh Tran
*Assistant Examiner* — Christopher K Peterson
(74) *Attorney, Agent, or Firm* — Nixon & Vanderhye, P.C.

(57) ABSTRACT

A real camera image of a real space that is captured by a real camera is obtained. Color information about a plurality of sampling points in the real camera image is obtained. Next, an average color is calculated based on the obtained color information about the plurality of sampling points. Based on the calculated average color, parameters relating to the color and brightness of a light source set in a virtual space are set. A virtual object image is generated by capturing, with a virtual camera, an image of a virtual object existing in the virtual space, which virtual object is illuminated by the light source whose parameters have been set. Then, a superimposed image, in which the virtual object image is superimposed on the real camera image, is generated and displayed on a display device.

12 Claims, 11 Drawing Sheets

MARKER COORDINATE SYSTEM

COMPUTER-READABLE STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

CROSS REFERENCE TO RELATED APPLICATION

The disclosure of Japanese Patent Application No. 2010-215653, filed on Sep. 27, 2010, is incorporated herein by reference.

BACKGROUND OF THE INVENTION

1. Field of the Invention

The present invention relates to a computer-readable storage medium having stored therein an image processing program for displaying an image of a virtual object such that the image of the virtual object is superimposed on a real space that is visible by a user, and relates to an image processing apparatus, an image processing system, and an image processing method.

2. Description of the Background Art

There is a conventional apparatus for superimposing a virtual object on an image of a real space that is captured by a real camera, thereby generating an image in which the virtual object looks as if the virtual object actually existed in the real space, and displaying the generated image on a display device. For example, an apparatus disclosed in Japanese Laid-Open Patent Publication No. 2003-256876 (hereinafter, referred to as Patent Document 1) captures, with a real camera, an image of an object indicator which is placed in a real space, and calculates the position and orientation of the object indicator in the real space. Then, a three-dimensional model is placed in a virtual space such that the position and orientation of the three-dimensional model in the virtual space correspond to the calculated position and the orientation in the real space. A virtual camera captures an image of the three-dimensional model placed in this manner in the virtual space. The image captured by the virtual camera is superimposed on the image captured by the real camera, and the resultant image is displayed.

However, according to Patent Document 1, the manner of displaying the virtual object is the same regardless of the environment of the real space, the image of which is captured. Therefore, a situation may arise where the displayed virtual object looks unnatural. For example, if the real space is dark, the entire image captured by the real camera also becomes dark. However, since the brightness of the virtual object superimposed on the image captured by the real camera does not change, only the virtual object is displayed in a manner to look bright. As a result, the virtual object unnaturally stands out in the display.

SUMMARY OF THE INVENTION

Therefore, an object of the present invention is to provide an image processing technique for generating an image that looks natural in the case of superimposing an image of a virtual object on a real space that is visible by a user.

The present invention has the following features to attain the object mentioned above.

One embodiment of the present invention is a computer-readable storage medium having stored therein an image processing program for causing a computer of an image processing apparatus, which is connected to a real camera for capturing an image of a real space and a display device including a screen on which the real space is visible, to act as real image obtaining means, color information obtaining means, light source setting means, object image generation means, and display control means. The real image obtaining means obtains a real image showing the real space that is captured by the real camera. The color information obtaining means obtains color information about at least one pixel of the real image obtained by the real image obtaining means. The light source setting means sets, based on the color information obtained by the color information obtaining means, at least one parameter relating to a color and/or a brightness of a light source placed in a virtual space. The object image generation means generates an object image that is obtained when an image of an object in the virtual space, which object is illuminated by the light source whose at least one parameter has been set by the light source setting means, is captured by the virtual camera. The display control means causes the display device to display the object image generated by the object image generation means, such that the object image is superimposed on the real space visible on the screen, in a manner to allow a user to view the object image.

According to the above, the setting of the light source in the virtual space can be determined based on the real image captured by the real camera, and an image of a virtual object illuminated by the light source can be captured by the virtual camera. Then, an object image that is obtained by capturing the image of the virtual object can be superimposed on the real space which is visible on the screen, and the resultant image can be displayed on the display device. For example, the display device can display an image that is obtained by superimposing the object image on a real image of the real space that is captured by the real camera. Alternatively, the display device can display an image that is obtained by superimposing the object image on the real space viewed through the screen which is a transparent screen. In the above manner, an object image that accords with the real environment of the real space can be generated. When such an object image is superimposed on the real space and the resultant image is displayed, the displayed image looks natural.

As another feature of the present invention, the image processing program may further cause the computer to act as detection means for detecting, from the real image obtained by the real image obtaining means, a specific target object whose color is known. The color information obtaining means may obtain color information about at least one pixel of an image that corresponds to the specific target object detected by the detection means.

According to the above, color information can be obtained based on the image that corresponds to the specific target object. Since the color of the specific target object is known, the color and brightness of light in the real environment can be obtained accurately.

As still another feature of the present invention, the color information obtaining means may obtain color information about a plurality of points in the image that corresponds to the specific target object detected by the detection means, and calculate an average value based on the obtained color information. In this case, the light source setting means sets the at least one parameter based on the average value calculated by the color information obtaining means.

According to the above, color information about a plurality of points on the specific target object is obtained. Therefore, for example, even in a case where an error occurs in recognizing the specific target object, or a case where a predetermined object different from the specific target object exists on a point about which the color information is to be obtained, or a case where specific light illuminates a point about which the color information is to be obtained, influences of such factors can be reduced.

As still another feature of the present invention, the color information obtaining means may obtain color information about at least one pixel of an image that corresponds to a portion, of the specific target object, that has a higher brightness than that of the other portions of the specific target object.

According to the above, information about the color and brightness of light in the real environment can be obtained more accurately as compared to a case where color information is obtained about a portion that has a relatively low brightness.

As still another feature of the present invention, the display control means may cause the display device to display the object image such that the object is shown to be on or near the specific target object.

According to the above, color information about the image that corresponds to the specific target object is obtained, and the setting of the virtual light source is determined based on the obtain color information. Then, the virtual object is illuminated by the light source whose setting has been thus determined, and an image of the virtual object is captured. The virtual object is displayed on or near the specific target object. In this manner, natural display is realized. Specifically, since the virtual object is placed in close proximity to a point about which the color information is obtained, the virtual object is displayed with a color and brightness that are substantially the same as the color and brightness of the point in the real environment. As a result, when the image of the virtual object is superimposed on the real space which is visible on the screen, the resultant image looks natural.

As still another feature of the present invention, the image processing program may further cause the computer to act as position and orientation information obtaining means and virtual camera setting means. The position and orientation information obtaining means obtains position and orientation information which corresponds to a position and an orientation of the real camera in the real space. The virtual camera setting means sets a position and an orientation, of the virtual camera in the virtual space, that correspond to the position and orientation information obtained by the position and orientation information obtaining means. The object image generation means generates the object image by capturing, with the virtual camera whose position and orientation have been set by the virtual camera setting means, an image of the object which is illuminated by the light source whose at least one parameter has been set by the light source setting means.

It should be noted that the position and orientation information, which is obtained by the position and orientation information obtaining means and which corresponds to the position and orientation of the real camera, may be the relative position and orientation of one of a predetermined target object existing in the real space and the real camera in relation to the other of the predetermined target object and the real camera. Specifically, the position and orientation information may be the relative position and orientation of the real camera in relation to the predetermined target object in the real space. Alternatively, the position and orientation information may be the relative position and orientation of the predetermined target object in the real space in relation to the real camera. Further, the position and orientation information may be the absolute position and orientation of the real camera that are detected by absolute position detection means (e.g., GPS) or orientation detection means (e.g., an angular velocity sensor, acceleration sensor, or geomagnetism detection means).

According to the above, an image can be generated in which the virtual object looks as if it actually existed in the real space. To be specific, the setting of the virtual camera is determined corresponding to the position and orientation of the real camera. Therefore, for example, if the position or orientation of the real camera changes, the position or orientation of the virtual camera also changes. Accordingly, the manner in which the virtual object appears in the display changes. This allows the user to feel as if the virtual object actually existed in the real space.

As still another feature of the present invention, the image processing program may further cause the computer to act as calculation means and virtual camera setting means. The calculation means calculates a relative position and a relative orientation of one of the specific target object detected by the detection means and the real camera in relation to the other of the specific target object and the real camera. The virtual camera setting means sets a position and an orientation of the virtual camera in the virtual space in accordance with a result of the calculating by the calculation means. The object image generation means generates the object image by capturing, with the virtual camera whose position and orientation have been set by the virtual camera setting means, the object which is illuminated by the light source whose at least one parameter has been set by the light source setting means.

According to the above, color information can be obtained based on the image that corresponds to the specific target object, and the setting of the virtual camera can be determined based on a result of the detection of the specific target object. This enables generating an image in which the virtual object looks as if it actually existed in the real space. To be specific, the setting of the virtual camera is determined corresponding to the position and orientation of the real camera. Therefore, for example, if the position or orientation of the real camera changes, the position or orientation of the virtual camera also changes. Accordingly, the manner in which the virtual object appears in the display changes. This allows the user to feel as if the virtual object actually existed in the real space.

As still another feature of the present invention, the image processing program may further cause the computer to act as storage means for storing the color information obtained by the color information obtaining means. In this case, the color information obtaining means obtains past color information stored in the storage means and current color information, and the light source setting means sets the at least one parameter based on the past color information and the current color information obtained by the color information obtaining means.

According to the above, the at least one parameter of the light source is set based on previously obtained past color information and current color information. This prevents, for example, a sudden change from occurring to the display of the virtual object.

As still another feature of the present invention, the color information obtaining means obtains the past color information stored in the storage means and the current color information, and calculates an average value based on the obtained color information. The light source setting means sets the at least one parameter based on the average value calculated by the color information obtaining means.

According to the above, an average value is calculated based on previously obtained past color information and current color information. This prevents a sudden change from occurring to the display of the virtual object. For example, even if erroneous color information is obtained due to erroneous recognition or the like in the current frame, the display of the virtual object does not suddenly change. This prevents the display from becoming unnatural.

As still another feature of the present invention, the image processing program may cause a computer of an image processing apparatus, which is connected to a real camera for capturing an image of a real space and a display device including a screen on which the real space is visible, to act as real image obtaining means, environment information obtaining means, light source setting means, object image generation means, and display control means. The real image obtaining means obtains a real image showing the real space that is captured by the real camera. The environment information obtaining means obtains information about a color and/or a brightness of the real space. The light source setting means sets, based on the information obtained by the environment information obtaining means, at least one parameter relating to a color and/or a brightness of a light source placed in a virtual space. The object image generation means generates an object image that is obtained when an image of an object in the virtual space, which object is illuminated by the light source whose at least one parameter has been set by the light source setting means, is captured by the virtual camera. The display control means causes the display device to display the object image generated by the object image generation means, such that the object image is superimposed on the real space visible on the screen, in a manner to allow a user to view the object image.

According to the above, the setting of the light source in the virtual space can be determined based on the color and/or the brightness of the real space, and an image of a virtual object illuminated by the light source can be captured by the virtual camera. Then, an object image that is obtained by capturing the image of the virtual object can be superimposed on the real space which is visible on the screen, and the resultant image can be displayed on the display device. In this manner, an object image that accords with the real environment of the real space can be generated. When such an object image is superimposed on the real space visible on the screen and the resultant image is displayed, the displayed image looks natural.

Another embodiment of the present invention may be an image processing apparatus that realizes the above-described respective means. Still another embodiment of the present invention may be an image processing system where multiple components that realize the above-described respective means operate in an interactive manner. The image processing system may be configured as a single apparatus, or may include multiple apparatuses.

According to the present invention, an object image that accords with the real environment of the real space can be generated. When such an object image is superimposed on the real space visible on the screen and the resultant image is displayed, the displayed image looks natural.

These and other objects, features, aspects and advantages of the present invention will become more apparent from the following detailed description of the present invention when taken in conjunction with the accompanying drawings.

DESCRIPTION OF THE PREFERRED EMBODIMENTS (Configuration of Game Apparatus)

Figure 1:
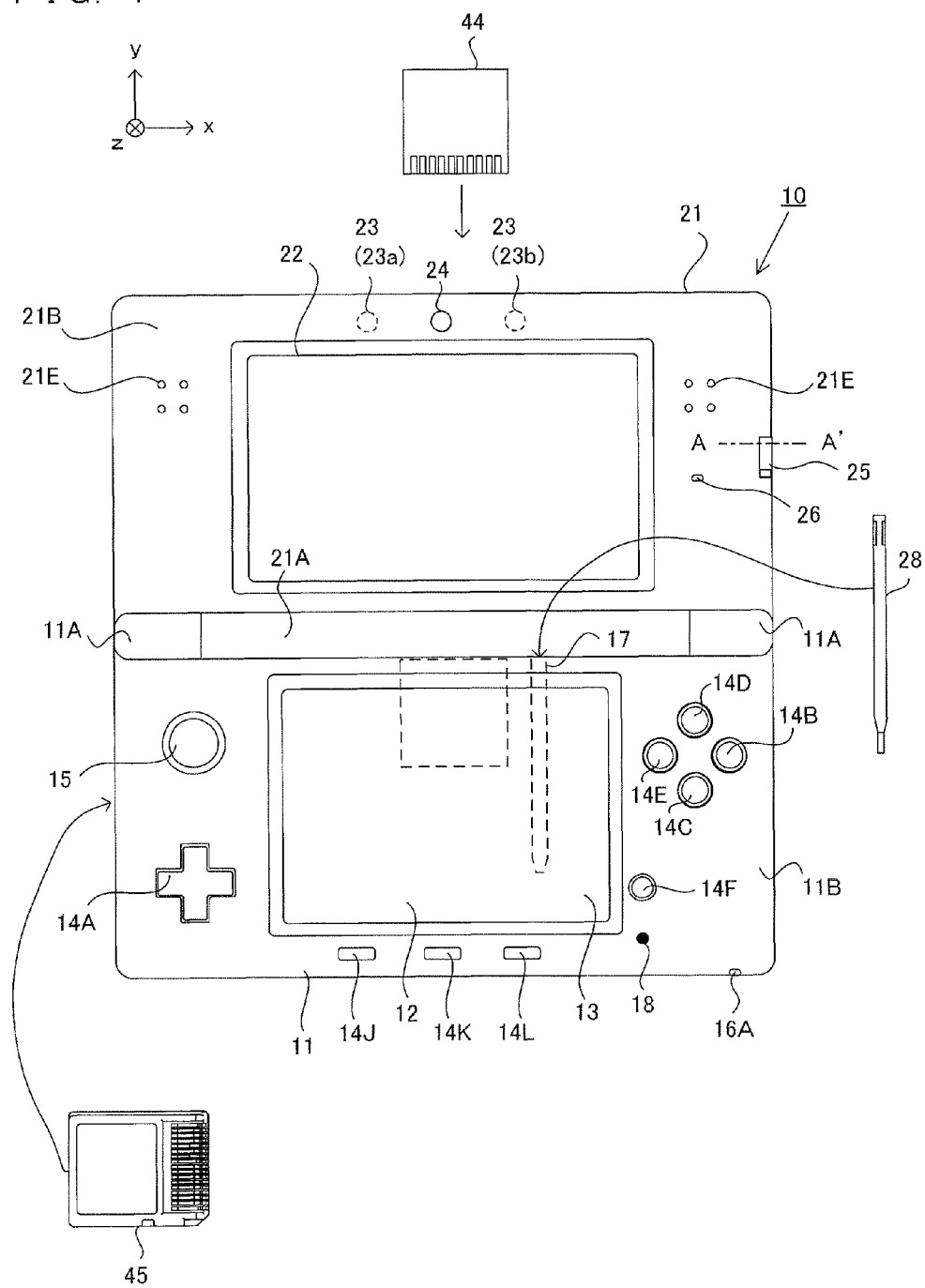
FIG. 1 is a front view of a game apparatus 10 in an opened state.
Figure 2:
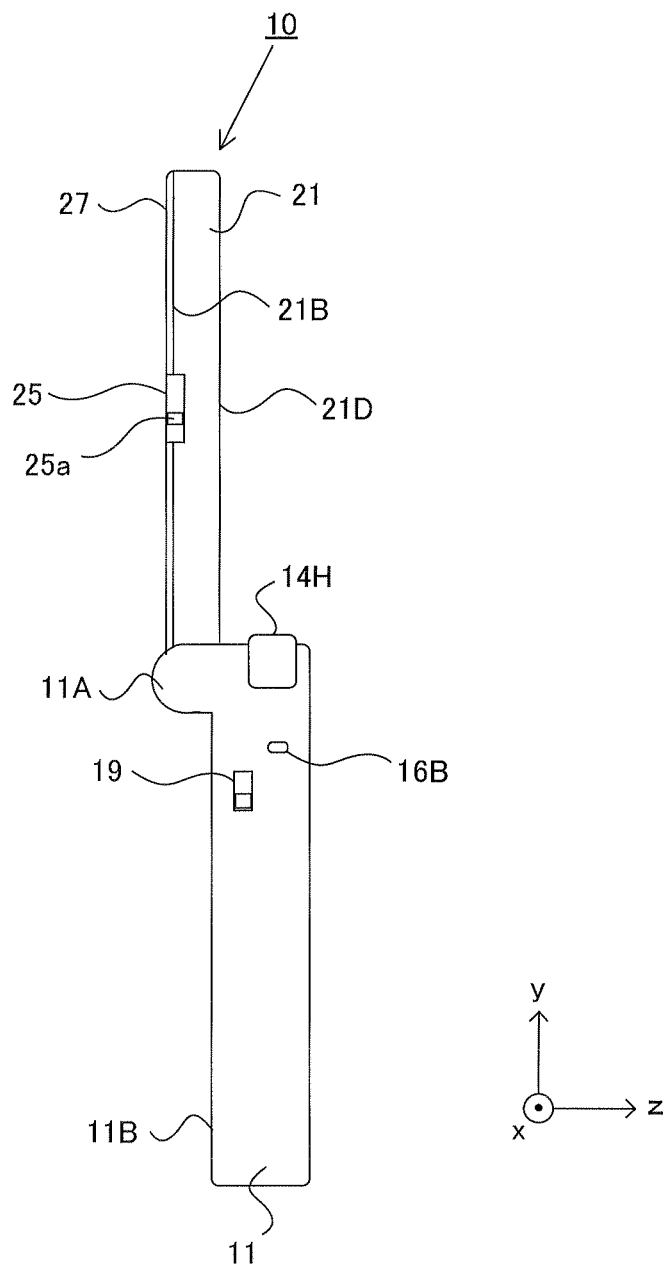
FIG. 2 is a right side view of the game apparatus 10 in the opened state
Figure 3:
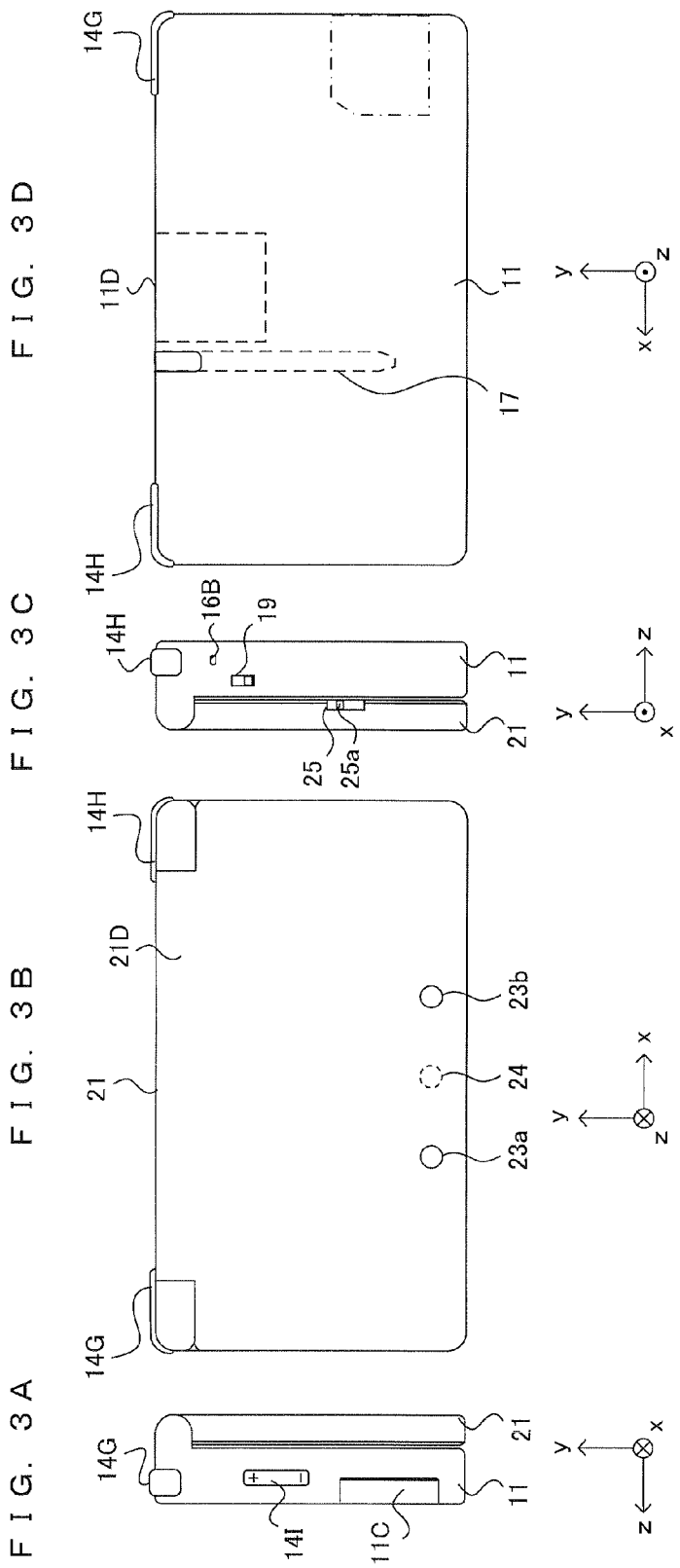
FIG. 3A is a left side view of the game apparatus 10 in a closed state.
FIG. 3B is a front view of the game apparatus 10 in the closed state.
FIG. 3C is a right side view of the game apparatus 10 in the closed state.
FIG. 3D is a rear view of the game apparatus 10 in the closed state.

Hereinafter, a game apparatus according to one embodiment of the present invention will be described. FIG. 1 to FIG. 3D are each a plan view showing an outer appearance of a game apparatus 10. The game apparatus 10 is a hand-held game apparatus, and is configured to be foldable as shown in FIG. 1 to FIG. 3D. FIG. 1 and FIG. 2 show the game apparatus 10 in an opened state, and FIG. 3A to FIG. 3D show the game apparatus 10 in a closed state. FIG. 1 is a front view of the game apparatus 10 in the opened state, and FIG. 2 is a right side view of the game apparatus 10 in the opened state. The game apparatus 10 is capable of capturing an image by means of an imaging section, displaying the captured image on its screen, and storing data of the captured image. The game apparatus 10 is also capable of executing a game program that is stored in an exchangeable memory card or a game program that is received from a server or another game apparatus, and displaying on its screen an image generated by computer graphics processing, such as an image captured by a virtual camera set in a virtual space.

Initially, an external structure of the game apparatus 10 will be described with reference to FIG. 1 to FIG. 3D. The game apparatus 10 includes a lower housing 11 and an upper housing 21 as shown in FIG. 1 to FIG. 3D. The lower housing 11 and the upper housing 21 are connected to each other so as to be openable and closable (i.e., foldable). In the present embodiment, the lower housing 11 and the upper housing 21 are each formed in a horizontally long plate-like rectangular shape, and are connected to each other at their longer sides in a pivotable manner.

As shown in FIG. 1 and FIG. 2, projections 11A, each of which projects in a direction perpendicular to an inner side surface 11B (the main surface) of the lower housing 11, are provided at the upper longer side of the lower housing 11, whereas a projection 21A, which projects from the lower side surface of the upper housing 21 in a direction perpendicular to the lower side surface of the upper housing 21, is provided at the lower longer side of the upper housing 21. Since the projections 11A of the lower housing 11 and the projection 21A of the upper housing 21 are connected to each other, the lower housing 11 and the upper housing 21 are foldably connected to each other.

(Description of Lower Housing)

Initially, a structure of the lower housing 11 will be described. As shown in FIG. 1 to FIG. 3D, the lower housing 11 includes a lower LCD (Liquid Crystal Display) 12, a touch panel 13, operation buttons 14A to 14L (FIG. 1 and FIG. 3A to FIG. 3D), an analog stick 15, an LED 16A and an LED 16B, an insertion opening 17, and a microphone hole 18. Hereinafter, these components will be described in detail.

As shown in FIG. 1, the lower LCD 12 is accommodated in the lower housing 11. The lower LCD 12 has a horizontally long shape, and is disposed such that the orientation of the longer sides thereof coincides with the orientation of the longer sides of the lower housing 11. The lower LCD 12 is disposed at the center of the lower housing 11. The lower LCD 12 is provided at the inner side surface (the main surface) of the lower housing 11, and the screen of the lower LCD 12 is exposed at an opening of the lower housing 11. When the game apparatus 10 is not used, the game apparatus 10 may be kept in the closed state. This prevents the screen of the lower LCD 12 from becoming unclean or damaged. The number of pixels of the lower LCD 12 may be, for example, 256 dots×192 dots (the horizontal line×the vertical line). The lower LCD 12 is a display device for displaying an image in a planar manner (not in a stereoscopically visible manner), which is different from an upper LCD 22 described below. Although an LCD is used as a display device in the present embodiment, any other display device such as a display device utilizing EL (Electro Luminescence) may be used, for example. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, a resistive film type touch panel is used as the touch panel 13. However, the touch panel 13 is not limited to a resistive film type touch panel, but may be any type of touch panel. For example, a touch panel of electrostatic capacitance type may be used as the touch panel 13. In the present embodiment, the touch panel 13 has the same resolution (detection accuracy) as that of the lower LCD 12. However, the resolution of the touch panel 13 and the resolution of the lower LCD 12 need not be the same. The insertion opening 17 (indicated by dashed lines in FIG. 1 and FIG. 3D) is provided in the upper side surface of the lower housing 11. The insertion opening 17 may be used for accommodating a stylus pen 28 which is used for performing an operation on the touch panel 13. Although an input on the touch panel 13 is usually performed by using the stylus pen 28, a finger of a user may be used for performing an input on the touch panel 13, in addition to the stylus pen 28.

The operation buttons 14A to 14L are each an input device for performing a predetermined input. As shown in FIG. 1, among the operation buttons 14A to 14L, a cross button 14A (a direction input button 14A), an "a" button 14B, a "b" button 14C, an "x" button 14D, a "y" button 14E, a power button 14F, a selection button 14J, a HOME button 14K, and a start button 14L are provided at the inner side surface (the main surface) of the lower housing 11. The cross button 14A is cross-shaped, and includes buttons for indicating up, down, left, right directions. The buttons 14B, 14C, 14D, and 14E are disposed in a manner to form a cross shape. The buttons 14A to 14E, the selection button 14J, the HOME button 14K, and the start button 14L are assigned respective functions, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 is provided to the left of the lower LCD 12, at the upper portion of the inner side surface of the lower housing 11. As shown in FIG. 1, the cross button 14A is provided to the left of the lower LCD 12, at the lower portion of the lower housing 11. That is, the analog stick 15 is provided above the cross button 14A. The analog stick 15 and the cross button 14A are designed to be located at such positions that the thumb of a left hand holding the lower housing can operate the analog stick 15 and the cross button 14A. Further, since the analog stick 15 is provided at the upper portion of the inner side surface of the lower housing 11, the position of the analog stick 15 is such that the thumb of a left hand holding the lower housing 11 is naturally placed on the position of the analog stick 15. Also, the position of the cross button 14A is such that the thumb of the left hand is placed on the position of the cross button 14A when the thumb of the left hand is slightly moved downward from the analog stick 15. The analog stick 15 has a keytop which is configured to slide parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object moves in a direction in which the keytop of the analog stick 15 is slid. It should be noted that any component that enables an analog input by being tilted by a predetermined amount in any direction among up, down, left, right, and diagonal directions may be used as the analog stick 15.

The positions of the four buttons forming the cross shape, that is, the "a" button 14B, the "b" button 14C, the "x" button 14D, and the "y" button 14E, are such that the thumb of a right hand holding the lower housing 11 is naturally placed on the positions of the four buttons. Further, the four buttons and the analog stick 15 are disposed such that the lower LCD 12 is located therebetween, and such that the four buttons and the analog stick 15 are in symmetrical positions with respect to the lower LCD 12. Accordingly, depending on a game program, a left-handed person can use these four buttons to input instructions indicating intended directions, for example.

Further, the microphone hole 18 is provided in the inner side surface of the lower housing 11. Under the microphone hole 18, a microphone (see FIG. 4), which will be described below, is provided as a sound input device, and the microphone detects a sound from the outside of the game apparatus 10.

FIG. 3A is a left side view of the game apparatus 10 in the closed state. FIG. 3B is a front view of the game apparatus 10 in the closed state. FIG. 3C is a right side view of the game apparatus 10 in the closed state. FIG. 3D is a rear view of the game apparatus 10 in the closed state. As shown in FIG. 3B and FIG. 3D, an L button 14G and an R button 14H are provided at the upper side surface of the lower housing 11. The L button 14G is provided at the left end of the upper side surface of the lower housing 11 and the R button 14H is provided at the right end of the upper side surface of the lower housing 11. Further, as shown in FIG. 3A, a sound volume button 14I is provided at the left side surface of the lower housing 11. The sound volume button 14I is used for adjusting the sound volume of a speaker of the game apparatus 10.

As shown in FIG. 3A, a cover 11C is provided at the left side surface of the lower housing 11 in an openable and closable manner. Inside the cover 11C, a connector (not shown) is provided for electrically connecting between the game apparatus 10 and an external data storage memory 45. The external data storage memory 45 is detachably attached to the connector. The external data storage memory 45 is used for, for example, saving (storing) data of an image captured by the game apparatus 10. The connector and the cover 11C may be provided at the right side surface of the lower housing 11.

As shown in FIG. 3D, an insertion opening 11D, through which an external memory 44 having a game program stored therein is inserted, is provided at the upper side surface of the lower housing 11. A connector (not shown) for electrically connecting between the game apparatus 10 and the external memory 44 in a detachable manner is provided inside the insertion opening 11D. A predetermined game program is executed when the external memory 44 is connected to the game apparatus 10. The connector and the insertion opening 11D may be provided at a different side surface (for example, the right side surface) of the lower housing 11.

As shown in FIG. 1 and FIG. 3C, a first LED 16A for notifying the user of the power ON/OFF state of the game apparatus 10 is provided at the lower side surface of the lower housing 11, and a second LED 16B for notifying the user whether wireless communication of the game apparatus 10 is currently established is provided at the right side surface of the lower housing 11. The game apparatus 10 is capable of performing wireless communication with other devices, and the second LED 16B is lit up while the wireless communication is established. The game apparatus 10 has a function of connecting to a wireless LAN by a method compliant with, for example, IEEE802.11.b/g standard. A wireless switch 19 for enabling/disabling the wireless communication function is provided at the right side surface of the lower housing 11 (see FIG. 3C).

A rechargeable battery (not shown) which is the power source for the game apparatus 10 is accommodated in the lower housing 11, and the battery can be charged through a terminal provided at a side surface (for example, the upper side surface) of the lower housing 11.

(Description of Upper Housing)

Next, a structure of the upper housing 21 will be described. As shown in FIG. 1 to FIG. 3C, the upper housing 21 includes the upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26. Hereinafter, theses components will be described in detail.

As shown in FIG. 1, the upper LCD 22 is accommodated in the upper housing 21. The upper LCD 22 has a horizontally long shape, and is disposed such that the orientation of the longer sides thereof coincides with the orientation of the longer sides of the upper housing 21. The upper LCD 22 is disposed at the center of the upper housing 21. The area of the screen of the upper LCD 22 is set to be greater than the area of the screen of the lower LCD 12. The screen of the upper LCD 22 is horizontally elongated as compared to the screen of the lower LCD 12. Specifically, the proportion of the horizontal width in the aspect ratio of the screen of the upper LCD 22 is set to be greater than the proportion of the horizontal width in the aspect ratio of the screen of the lower LCD 12.

The screen of the upper LCD 22 is provided at an inner side surface 21B (the main surface) of the upper housing 21, and the screen of the upper LCD 22 is exposed at an opening of the upper housing 21. As shown in FIG. 2, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 640 dots×200 dots (the horizontal line× the vertical line). Although, in the present embodiment, the upper LCD 22 is a liquid crystal display device, a display device utilizing EL (Electro Luminescence) or the like may be used instead. In addition, a display device having any resolution may be used as the upper LCD 22.

The upper LCD 22 is a display device capable of displaying a stereoscopically visible image (such an image may be alternatively referred to as a "stereoscopic image"). In the present embodiment, an image for left eye and an image for right eye are displayed by using substantially the same display area. Specifically, the upper LCD 22 may be a display device using a method in which the image for left eye and the image for right eye are alternately displayed in the horizontal direction in predetermined units (for example, every other line). Alternatively, a display device using a method in which the image for left eye and the image for right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used for enabling the image for left eye and the image for right eye, which are alternately displayed in the horizontal direction, to be separately viewed by the left eye and the right eye, respectively. In the present embodiment, the upper LCD 22 of a parallax barrier type is used. The upper LCD 22 displays, by using the image for right eye and the image for left eye, an image (a stereoscopic image) which is stereoscopically visible with naked eyes. That is, the upper LCD 22 allows a user to view, by means of a parallax barrier, the image for left eye with the user's left eye and the image for right eye with the user's right eye. In this manner, a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (i.e., it is possible to display an image not in the above-described stereoscopically visible manner but in a planar manner; specifically, a display mode is used in which the same displayed image is viewed by both left and right eyes.). Thus, the upper LCD 22 is a display device capable of switching between a stereoscopic display mode for displaying a stereoscopically visible image and a planar display mode for displaying an image in a planar manner (i.e., for displaying a planar visible image). The switching of the display mode is performed by the 3D adjustment switch 25 described below.

Two imaging sections (23a and 23b) provided at the outer side surface (the back surface reverse of the main surface at which the upper LCD 22 is provided) 21D of the upper housing 21 are collectively referred to as the outer imaging section 23. Both directions in which the outer imaging section (left) 23a and the outer imaging section (right) 23b capture images, respectively, extend outward from the outer side surface 21D and are both normal to the outer side surface 21D. Further, these imaging sections are each designed to be positioned in a direction that is opposite, by 180 degrees, to a direction that extends inward from and normal to the display surface (inner side surface) of the upper LCD 22. Specifically, the direction in which the outer imaging section (left) 23a captures an image and the direction in which the outer imaging section (right) 23b captures an image are parallel to each other. The outer imaging section (left) 23a and the outer imaging section (right) 23b can be used as a stereo camera in accordance with a program executed by the game apparatus 10. Further, depending on a program, the outer imaging section 23 may be used as a non-stereo camera where one of the two outer imaging sections (23a and 23b) is used alone. Further, depending on a program, images captured by the two outer imaging sections (23a and 23b) may be combined with each other or may compensate for each other, thereby enabling capturing an image with a wide angle. In the present embodiment, the outer imaging section 23 includes two imaging sections, that is, the outer imaging section (left) 23a and the outer imaging section (right) 23b. Each of the outer imaging section (left) 23a and the outer imaging section (right) 23b includes an imaging device (such as a CCD image sensor or a CMOS image sensor) having the same predetermined resolution, and a lens. The lens may have a zooming mechanism.

As indicated by dashed lines in FIG. 1 and by solid lines in FIG. 3B, the outer imaging section (left) 23a and the outer imaging section (right) 23b forming the outer imaging section 23 are aligned in parallel to the horizontal direction of the screen of the upper LCD 22. Specifically, the outer imaging section (left) 23a and the outer imaging section (right) 23b are disposed such that a straight line connecting between the two imaging sections is parallel to the horizontal direction of the screen of the upper LCD 22. Reference numerals 23a and 23b which are indicated by dashed lines in FIG. 1 represent the outer imaging section (left) 23a and the outer imaging section (right) 23b, respectively, which are disposed at the outer side surface reverse of the inner side surface of the upper housing 21. As shown in FIG. 1, when a user views the screen of the upper LCD 22 from the front thereof, the outer imaging section (left) 23a is positioned on the left side and the outer imaging section (right) 23b is positioned on the right side. While a program for causing the outer imaging section 23 to act as a stereo camera is executed, the outer imaging section (left) 23a captures an image for left eye, which is viewed by the left eye of the user, and the outer imaging section (right) 23b captures an image for right eye, which is viewed by the right eye of the user. A distance between the outer imaging section (left) 23a and the outer imaging section (right) 23b is set to be approximately the same as a distance between both eyes of a person. That is, the distance may be set to be within a range from 30 mm to 70 mm, for example. However, the distance between the outer imaging section (left) 23a and the outer imaging section (right) 23b is not limited to be within this range.

In the present embodiment, the outer imaging section (left) 23a and the outer imaging section (right) 23b are fixed to the housing, and their image capturing directions cannot be changed.

The outer imaging section (left) 23a and the outer imaging section (right) 23b are disposed at horizontally symmetrical positions with respect to the center of the upper LCD 22. Specifically, the outer imaging section (left) 23a and the outer imaging section (right) 23b are disposed at symmetrical positions with respect to a line that divides the upper LCD 22 into two equal parts, that is, the left part and the right part. Further, the outer imaging section (left) 23a and the outer imaging section (right) 23b are disposed at positions that are reverse of positions above the upper edge of the screen of the upper LCD 22 and that are on the upper portion of the upper housing 21 in the opened state. Specifically, if the upper LCD 22 is projected on the outer side surface of the upper housing 21, then the outer imaging section (left) 23a and the outer imaging section (right) 23b are located, on the outer side surface of the upper housing 21, at positions above the upper edge of the screen of the upper LCD 22 having been projected.

As described above, the two imaging sections (23a and 23b) of the outer imaging section 23 are disposed at horizontally symmetrical positions with respect to the center of the upper LCD 22. Therefore, when a user views the upper LCD 22 from the front thereof, the image capturing direction of the outer imaging section 23 coincides with the direction of the line of sight of the user. Further, the outer imaging section 23 is disposed at a position reverse of a position above the upper edge of the screen of the upper LCD 22. Therefore, the outer imaging section 23 and the upper LCD 22 do not interfere with each other inside the upper housing 21. Accordingly, the upper housing 21 may have a reduced thickness as compared to a case where the outer imaging section 23 is disposed at a position reverse of the position of the screen of the upper LCD 22.

The inner imaging section 24 is provided at the inner side surface (the main surface) 21B of the upper housing 21, and acts as an imaging section which captures an image in a direction that extends inward from and normal to the inner side surface. The inner imaging section 24 includes an imaging device (such as a CCD image sensor and a CMOS image sensor) having a predetermined resolution, and a lens. The lens may have a zooming mechanism.

As shown in FIG. 1, when the upper housing 21 is in the opened state, the inner imaging section 24 is disposed, at the upper portion of the upper housing 21, above the upper edge of the screen of the upper LCD 22. Further, the inner imaging section 24 is disposed at the horizontal center of the upper housing 21 (on a line that separates the upper housing 21 (the screen of the upper LCD 22) into two equal parts, that is, the left part and the right part). Specifically, as shown in FIG. 1 and FIG. 3B, the inner imaging section 24 is disposed at the inner side surface of the upper housing 21 at a position reverse of the middle position between the left and right imaging sections (the outer imaging section (left) 23a and the outer imaging section (right) 23b) of the outer imaging section 23. Specifically, if the left and right imaging sections of the outer imaging section 23 provided at the outer side surface of the upper housing 21 are projected on the inner side surface of the upper housing 21, then the inner imaging section 24 is located at the middle position between the left and right imaging sections having been projected. Reference numeral 24 which is indicated by a dashed line in FIG. 3B represents the inner imaging section 24 which is disposed at the inner side surface of the upper housing 21.

As described above, the inner imaging section 24 is used for capturing an image in the direction opposite to the image capturing direction of the outer imaging section 23. The inner imaging section 24 is provided at the inner side surface of the upper housing 21 at the position reverse of the middle position between the left and right imaging sections of the outer imaging section 23. Thus, when a user views the upper LCD 22 from the front thereof, the inner imaging section 24 can capture an image of the face of the user from the front thereof. Further, the left and right imaging sections of the outer imaging section 23 do not interfere with the inner imaging section 24 inside the upper housing 21, thereby enabling reduction of the thickness of the upper housing 21.

The 3D adjustment switch 25 is a slide switch, and is used for switching the display mode of the upper LCD 22 as described above. Further, the 3D adjustment switch 25 is used for adjusting the stereoscopic effect of a stereoscopically visible image (stereoscopic image) that is displayed on the upper LCD 22. As shown in FIG. 1, FIG. 2, and FIG. 3C, the 3D adjustment switch 25 is provided at the edge where the inner side surface and the right side surface of the upper housing 21 meet, and is provided at such a position that the 3D adjustment switch 25 is visible to a user when the user views the upper LCD 22 from the front thereof Further, the 3D adjustment switch 25 has an operation portion projecting on both the inner side surface and the right side surface, and can be viewed and operated from both sides. All the switches other than the 3D adjustment switch 25 are provided at the lower housing 11.

The 3D adjustment switch 25 is disposed such that the 3D adjustment switch 25 is visible on both the front surface and the right side surface of the upper housing 21 as shown in FIG. 1 and FIG. 2. The 3D adjustment switch 25 has slider 25a which is slidable to any position in a predetermined direction (in the longitudinal direction along the right side surface), and the display mode of the upper LCD 22 may be set, or the stereoscopic effect of a displayed stereoscopic image may be adjusted, in accordance with the position of the slider 25a. For example, a distance between virtual cameras (of a virtual stereo camera) described below may be set in accordance with the position of the slider 25a of the 3D adjustment switch 25. Further, a positional relationship between an image for left eye that is captured by a left virtual camera of the virtual stereo camera and an image for right eye that is captured by a right virtual camera of the virtual stereo camera may be adjusted. To be specific, for example, in a case where the slider 25a of the 3D adjustment switch 25 is located at its uppermost position (i.e., upward in FIG. 1 and FIG. 2), a positional discrepancy between the image for left eye and the image for right eye with respect to the horizontal direction (i.e., the horizontal direction of the screen of the upper LCD 22; the horizontal direction in FIG. 1) is set to the upper limit value. If the positional discrepancy between the image for left eye and the image for right eye with respect to the horizontal direction is set to the upper limit value, the parallax between these two images is great. Accordingly, when the user views the two images displayed on the upper LCD 22 through the parallax barrier, an image displayed on the screen of the upper LCD 22 looks as if the image clearly emerged from the screen toward the user. In this manner, the parallax between two images may be adjusted by using the 3D adjustment switch 25.

The 3D indicator 26 indicates whether the upper LCD 22 is in the stereoscopic display mode. The 3D indicator 26 is an LED, and is lit up when the stereoscopic display mode of the upper LCD 22 is enabled. The 3D indicator 26 may be lit up only in a case where program processing for displaying a stereoscopically visible image is performed when the upper LCD 22 is in the stereoscopic display mode. As shown in FIG. 1, the 3D indicator 26 is provided at the inner side surface of the upper housing 21 near the screen of the upper LCD 22. Accordingly, when a user views the screen of the upper LCD 22 from the front thereof, the user can easily view the 3D indicator 26. Therefore, even when the user is viewing the screen of the upper LCD 22, the user can easily recognize the display mode of the upper LCD 22.

Further, speaker holes 21E are formed in the inner side surface of the upper housing 21. A sound from a below-described speaker 43 is outputted through the speaker holes 21E.

(Internal Configuration of Game Apparatus 10)

Figure 4:
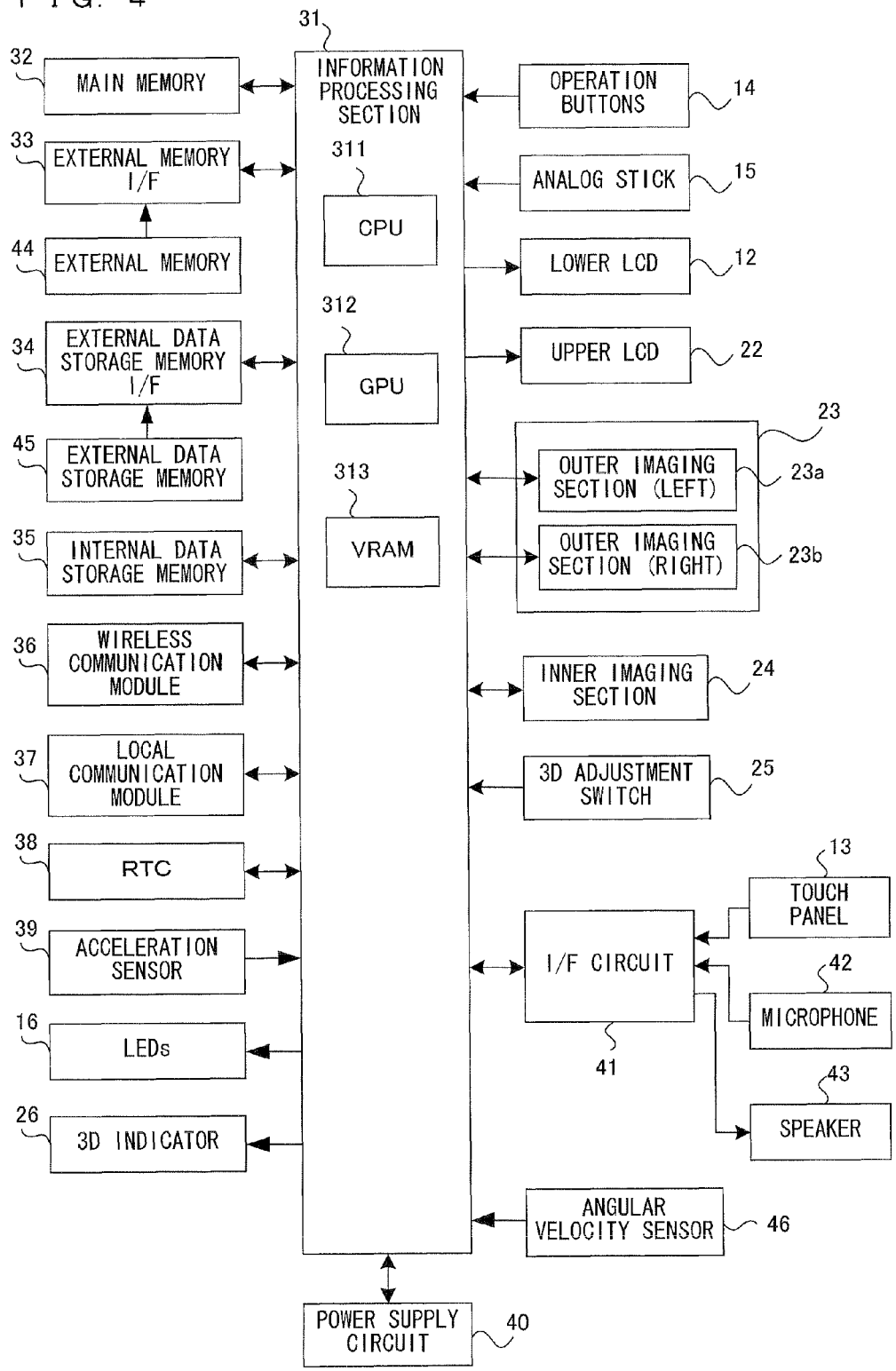
FIG. 4 is a block diagram showing an internal configuration of the game apparatus 10.

Next, an internal electrical configuration of the game apparatus 10 will be described with reference to FIG. 4. FIG. 4 is a block diagram showing an internal configuration of the game apparatus 10. As shown in FIG. 4, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit board, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 44 connected to the external memory I/F 33 or the internal data storage memory 35) inside the game apparatus 10. The CPU 311 of the information processing section 31 executes image processing (FIG. 12) described below by executing the predetermined program. The program executed by the CPU 311 of the information processing section 31 may be obtained from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the image processing, and temporarily stores a program obtained from the outside (i.e., from the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is structured as, for example, a read-only semiconductor memory. When the external memory 44 is connected to the external memory I/F 33, the information processing section 31 can load a program stored in the external memory 44. Predetermined processing is performed when the program loaded by the information processing section 31 is executed. The external data storage memory 45 is structured as a non-volatile readable and writable memory (for example, a NAND flash memory), and is used for storing predetermined data. For example, images captured by the outer imaging section 23 and/or images captured by another device are stored in the external data storage memory 45. When the external data storage memory 45 is connected to the external data storage memory I/F 34, the information processing section 31 can load an image stored in the external data storage memory 45, and display the image on the upper LCD 22 and/or the lower LCD 12.

The internal data storage memory 35 is structured as a non-volatile readable and writable memory (for example, a NAND flash memory), and is used for storing predetermined data. For example, data and/or programs downloaded through the wireless communication module 36 by wireless communication are stored in the internal data storage memory 35.

The wireless communication module 36 has a function of connecting to a wireless LAN by a method compliant with, for example, IEEE 802.11.b/g standard. The local communication module 37 has a function of performing wireless communication with the same type of game apparatus by a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and perform data transmission to and data reception from the same type of another game apparatus by using the local communication module 37.

The acceleration sensor 39 is connected to the information processing section 31. The acceleration sensor 39 detects magnitudes of acceleration (linear acceleration) in the directions of respective straight lines along three axes (xyz axes). The acceleration sensor 39 is provided inside the lower housing 11. In the acceleration sensor 39, as shown in FIG. 1, the direction along the longer sides of the lower housing 11 is defined as an x-axial direction, the direction along the shorter sides of the lower housing 11 is defined as a y-axial direction, and the direction perpendicular to the inner side surface (the main surface) of the lower housing 11 is defined as a z-axial direction. The acceleration sensor 39 detects the magnitudes of linear acceleration in the respective axial directions. The acceleration sensor 39 is, for example, an electrostatic capacitance type acceleration sensor. However, another type of acceleration sensor may be used. The acceleration sensor 39 may be an acceleration sensor for detecting the magnitude of acceleration in one axial direction or two-axial directions. The information processing section 31 receives data (acceleration data) that indicates acceleration detected by the acceleration sensor 39, thereby detecting the orientation and motion of the game apparatus 10. In the present embodiment, the information processing section 31 determines, based on the acceleration detected by the acceleration sensor 39, the orientation (inclination) of the game apparatus 10.

The RTC 38 and the power supply circuit 40 are connected to the information processing section 31. The RTC 38 counts time, and outputs the time to the information processing section 31. The information processing section 31 calculates the current time (date) based on the time counted by the RTC 38. The power supply circuit 40 controls power from the power source (i.e., the rechargeable battery accommodated in the lower housing 11 as described above) of the game apparatus 10, and supplies the power to each component of the game apparatus 10.

The I/F circuit 41 is connected to the information processing section 31. A microphone 42 and the speaker 43 are connected to the I/F circuit 41. Specifically, the speaker 43 is connected to the I/F circuit 41 through an amplifier which is not shown. The microphone 42 detects a voice uttered by a user, and outputs a sound signal to the I/F circuit 41, accordingly. The amplifier amplifies a sound signal from the I/F circuit 41, and a resultant sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. For example, the sound control circuit performs A/D conversion and D/A conversion on sound signals, and also converts sound signals into a predetermined form of sound data. The touch panel control circuit generates a predetermined form of touch position data based on a signal outputted from the touch panel 13, and outputs the touch position data to the information processing section 31. The touch position data indicates coordinates of a position, on an input surface of the touch panel 13, at which an input has been performed. The touch panel control circuit reads a signal outputted from the touch panel 13 and generates touch position data once in every predetermined period. The information processing section 31 obtains the touch position data to recognize a position, on the touch panel 13, at which an input has been performed.

Operation buttons 14 include the above-described operation buttons 14A to 14L, and are connected to the information processing section 31. The operation buttons 14 output, to the information processing section 31, operation data indicating input states of the respective operation buttons 14A to 14L (i.e., indicating whether the operation buttons 14A to 14L have been pressed). The information processing section 31 obtains the operation data from the operation buttons 14 to perform processing in accordance with the inputs performed via the operation buttons 14.

The lower LCD 12 and the upper LCD 22 are connected to the information processing section 31. The lower LCD 12 and the upper LCD 22 each display an image in accordance with an instruction from (the GPU 312 of) the information processing section 31.

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for right eye and an image for left eye, which are stored in the VRAM 313 of the information processing section 31, are outputted to the upper LCD 22. More specifically, the LCD controller alternately repeats reading of pixel data of the image for right eye for one line in the vertical direction, and reading of pixel data of the image for left eye for one line in the vertical direction, thereby reading, from the VRAM 313, the image for right eye and the image for left eye. Thus, an image to be displayed is divided into images for right eye and images for left eye, each of which is a rectangle-shaped image having one line of pixels aligned in the vertical direction. Then, an image, in which the rectangle-shaped images for right eye that are obtained through the division and the rectangle-shaped images for left eye that are obtained through the division are alternately arranged, is displayed on the screen of the upper LCD 22. A user views the image through the parallax barrier in the upper LCD 22, so that the images for right eye are viewed by the user's right eye and the images for left eye are viewed by the user's left eye. In this manner, a stereoscopically visible image is displayed on the screen of the upper LCD 22.

The outer imaging section 23 and the inner imaging section 24 are connected to the information processing section 31. The outer imaging section 23 and the inner imaging section 24 each capture an image in accordance with an instruction from the information processing section 31, and output data of the captured image to the information processing section 31. For example, the information processing section 31 instructs one of the outer imaging section 23 and the inner imaging section 24 to capture an image, and the imaging section that receives the instruction captures an image and transmits data of the captured image to the information processing section 31. For example, a user selects the imaging section to use through a touch operation using the touch panel 13. When the information processing section 31 (the CPU 311) detects the selection of the imaging section, the information processing section 31 instructs the selected one of the outer imaging section 23 and the inner imaging section 24 to capture an image.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls lighting-up of the 3D indicator 26. In the present embodiment, the information processing section 31 lights up the 3D indicator 26 when the upper LCD 22 is in the stereoscopic display mode. The game apparatus 10 has the internal configuration as described above.

An angular velocity sensor 46 is connected to the information processing section 31. The angular velocity sensor 46 detects angular velocities around respective axes (x-axis, y-axis, z-axis). The game apparatus 10 is capable of calculating the orientation of the game apparatus 10 in real space based on the angular velocities that are successively detected by the angular velocity sensor 46. Specifically, the game apparatus 10 is capable of calculating the rotation angle of the game apparatus 10 around each axis by integrating, with time, the angular velocities which the angular velocity sensor 46 detects in relation to the axis.

(Brief Description of Image Processing)

Next, the image processing performed by the game apparatus 10 according to the present embodiment will be briefly described. In the present embodiment, a virtual object is displayed in a superimposed manner when an image of a specific target object existing in a real space (specifically, a marker described below) is captured by using the outer imaging section 23. The color and brightness of the displayed virtual object are changed in accordance with the color and brightness of the real space. Hereinafter, first, a description is given of an image displayed by the game apparatus 10. Thereafter, a description is given of the color and brightness of the virtual object being changed in accordance with the color and brightness of the real space.

Figure 5:
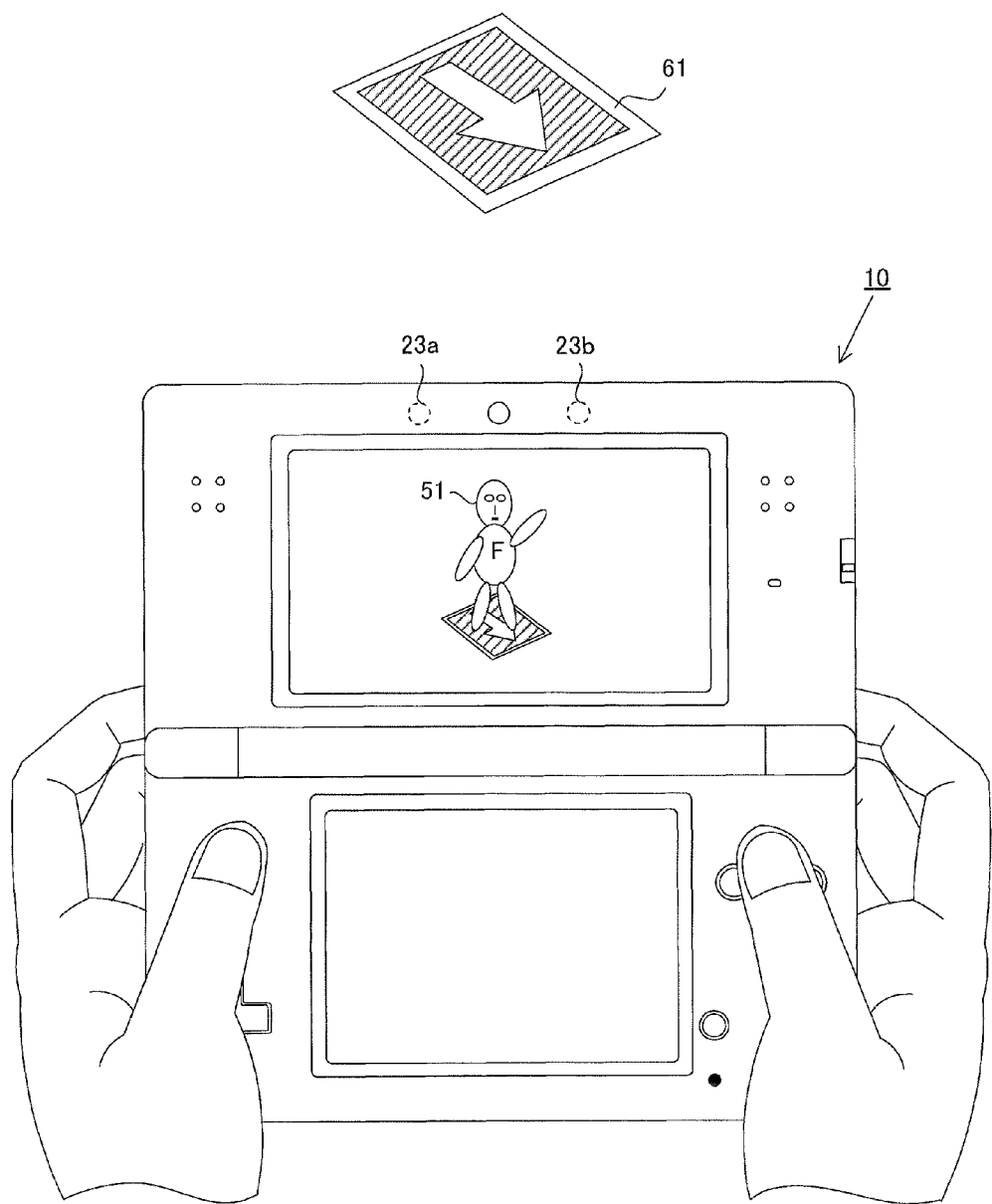
FIG. 5 shows an example of an image that is displayed on an upper LCD 22 when, in a case where image processing according to an embodiment of the present invention is performed, an image of a marker 61 placed in advance in a real space is captured by an outer imaging section 23.

FIG. 5 shows an example of an image that is displayed on the upper LCD 22 when, in a case where the image processing according to the present embodiment is performed, an image of a marker 61 placed in advance in a real space is captured by the outer imaging section 23.

As shown in FIG. 5, the marker 61 is placed in the real space in the image capturing direction of the outer imaging section 23 of the game apparatus 10. The marker 61 is a piece of rectangular paper, and there is an arrow drawn at the center of the paper. Specifically, a rectangular area smaller than the marker 61 is formed at the center of the marker 61, and the entire rectangular area is colored with a predetermined color. An outline arrow is drawn at the center of the rectangular area which is entirely colored with the predetermined color. The direction indicated by the arrow drawn at the center of the marker 61 is parallel to the longer sides of the marker 61. The information processing section 31 of the game apparatus 10 (i.e., the CPU 311) performs image processing such as pattern matching on an image captured by the outer imaging section 23, thereby detecting the marker 61 contained in the image. If the marker 61 is detected in the image captured by the outer imaging section 23, a virtual character is shown in the image captured by the outer imaging section 23, which is displayed on the upper LCD 22. On the other hand, if the marker 61 is not detected in the image captured by the outer imaging section 23, a message is displayed on the upper LCD 22, indicating that the marker 61 has not been detected. Accordingly, the virtual character is not displayed.

To be specific, if the marker 61 is detected, the upper LCD 22 displays a real image captured by the outer imaging section 23 (i.e., an image that captures the real space and that includes the marker 61 and the background), such that a virtual character 51 is superimposed on the real image. The virtual character 51 is a character existing in a virtual space. For example, the virtual character 51 may be a virtual object resembling a human being. To be more specific, the upper LCD 22 displays a state where the virtual character 51 is on the marker 61.

The image displayed on the upper LCD 22 is a stereoscopically visible image. That is, the real image captured by the outer imaging section 23 contains a real image for left eye captured by the outer imaging section (left) 23a and a real image for right eye captured by the outer imaging section (right) 23b. Moreover, images of the virtual character 51 are captured by a virtual stereo camera (i.e., by a left virtual camera and a right virtual camera, respectively) existing in the virtual space, and then displayed such that the captured images are superimposed on the aforementioned real image. To be specific, the image of the virtual character 51 that is captured by the left virtual camera is superimposed on the real image for left eye that is captured by the outer imaging section (left) 23a. In this manner, a superimposed image for left eye is generated. Similarly, the image of the virtual character 51 that is captured by the right virtual camera is superimposed on the real image for right eye that is captured by the outer imaging section (right) 23b. In this manner, a superimposed image for right eye is generated. Then, these two superimposed images are displayed on the upper LCD 22. Via the parallax barrier, the user's left eye recognizes the superimposed image for left eye and the user's right eye recognizes the superimposed image for right eye. This allows the user to view a stereoscopic image.

Figure 6:
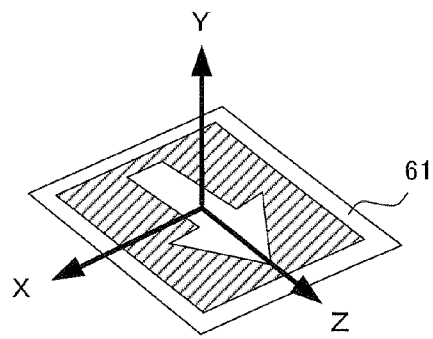
FIG. 6 shows the definition of a coordinate system in a virtual space.

The virtual character 51 is an object placed in the virtual space. FIG. 6 shows the definition of a coordinate system in the virtual space. The virtual space is defined by an XYZ coordinate system (a marker coordinate system), the origin of which is the center of the marker 61. In the marker coordinate system, the Z-axis is set along the same direction as that indicated by the arrow of the marker 61 (i.e., forward direction); the X-axis is set along a direction that extends to the right with respect to the direction indicated by the arrow (i.e., rightward direction); and the Y-axis is set along a direction that is perpendicularly upward with respect to the marker 61 (i.e., upward direction). In this manner, the coordinate system of the virtual space is defined with respect to the marker 61 placed in the real space. Accordingly, correspondence is made between the real space and the virtual space. The virtual character 51 is placed in the virtual space thus defined. For example, the virtual character 51 is placed at the origin (0, 0, 0) of the coordinate system (marker coordinate system) of the virtual space, and a direction in which the virtual character 51 faces (i.e., the orientation of the virtual character 51) is set to coincide with the X-axis being rotated around the Y-axis by 45 degrees.

Figure 7:
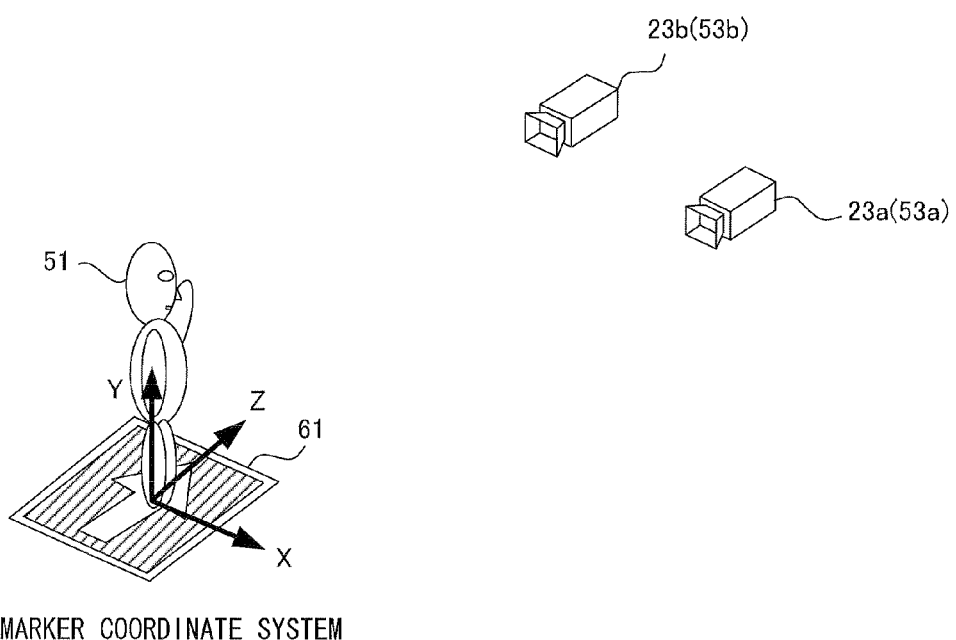
FIG. 7 shows a state where a virtual character 51 is placed in the virtual space.

FIG. 7 shows a state where the virtual character 51 is placed in the virtual space. As shown in FIG. 7, the virtual character 51 is placed at the origin of the marker coordinate system, and images of the virtual character 51 are captured by a left virtual camera 53a and a right virtual camera 53b which are placed in the virtual space. The left virtual camera 53a is provided for capturing an image of the virtual space that is viewed by the left eye of the user, and the right virtual camera 53b is provided for capturing an image of the virtual space that is viewed by the right eye of the user. To be specific, the position and orientation of the left virtual camera 53a in the marker coordinate system coincide with the position and orientation of the outer imaging section (left) 23a in the real space. Similarly, the position and orientation of the right virtual camera 53b in the marker coordinate system coincide with the position and orientation of the outer imaging section (right) 23b in the real space.

Figure 8:
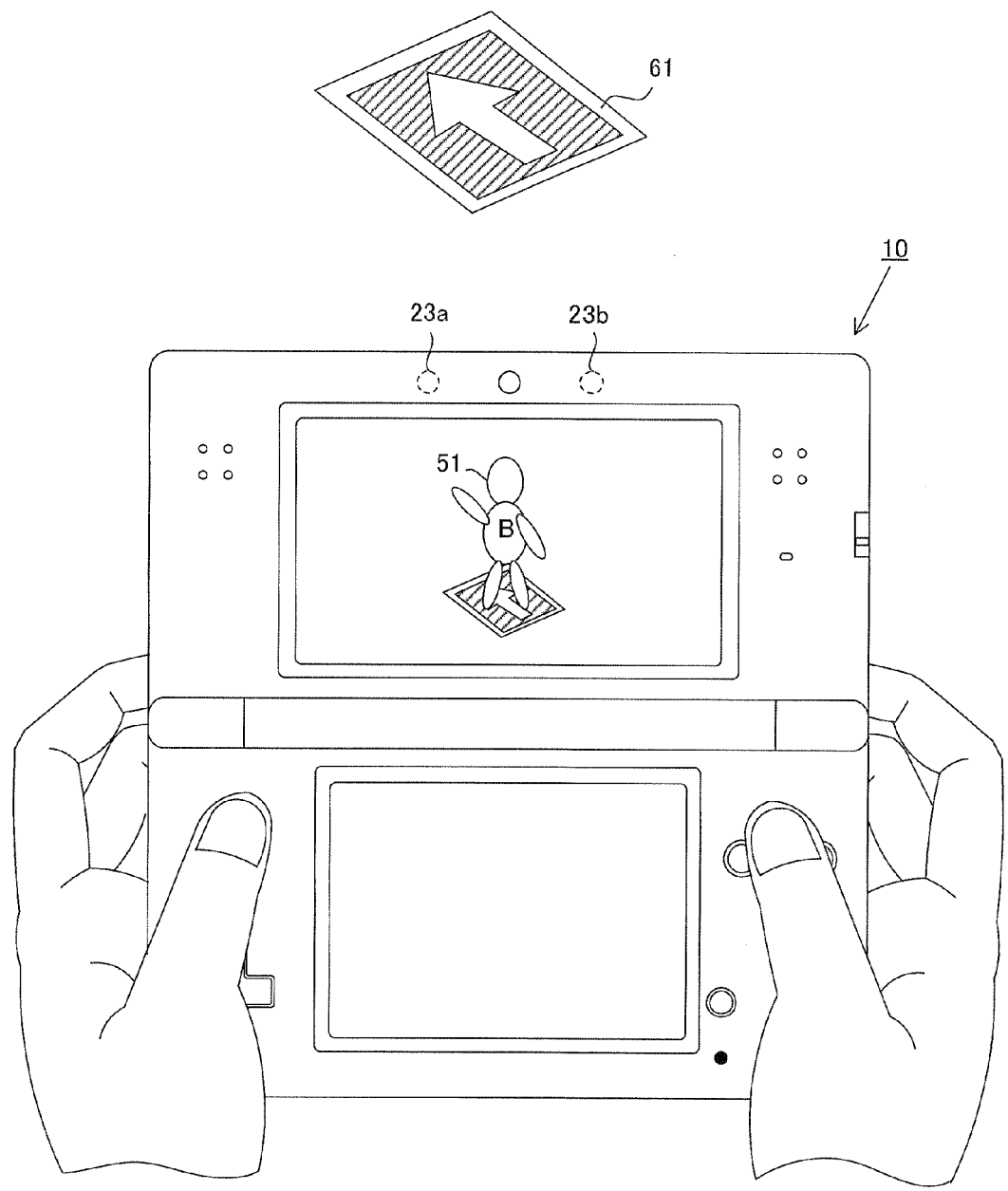
FIG. 8 shows an example of an image that is displayed on the upper LCD 22 when an image of the marker 61 is captured from a direction opposite to a direction shown in FIG. 5.

In a case where the virtual space is defined based on the marker 61 and the virtual character 51 is placed in the virtual space in the above manner, if the position or image capturing direction of the outer imaging section 23 is changed, a corresponding change occurs to the virtual character 51 displayed on the upper LCD 22. FIG. 8 shows an example of an image that is displayed on the upper LCD 22 when an image of the marker 61 is captured from a direction opposite to the direction shown in FIG. 5. FIG. 8 shows an image that is displayed on the upper LCD 22 in a case where the marker 61 shown in FIG. 5 is rotated by 180 degrees on an axis that extends through the center of the marker 61 and that is perpendicular to the marker 61, while the position and orientation of the game apparatus 10 (i.e., the outer imaging section 23) are kept fixed. Alternatively, FIG. 8 shows an image that is displayed on the upper LCD 22 in a case where the game apparatus 10 is rotated by 180 degrees around the axis that extends through the center of the marker 61 and that is perpendicular to the marker 61, while the marker 61 shown in FIG. 5 is kept fixed.

As shown in FIG. 8, if a positional relationship in the real space between the game apparatus 10 (the outer imaging section 23) and the marker 61 (i.e., a relative positional relationship in terms of distance or orientation) changes, then a corresponding change occurs to the virtual character 51 displayed on the upper LCD 22. To be specific, if the positional relationship between the game apparatus 10 and the marker 61 is as shown in FIG. 5, the front face of the virtual character 51 is displayed. On the other hand, if the positional relationship between the game apparatus 10 and the marker 61 is as shown in FIG. 8 (i.e., the arrow of the marker 61 is in the opposite direction to that shown in FIG. 5), then the back face of the virtual character 51 is displayed. That is, if the position or orientation of the outer imaging section 23 changes, then the positions or orientations of the left and right virtual cameras change in accordance with the change regarding the outer imaging section 23. Accordingly, the manner in which the virtual character 51 appears on the upper LCD 22 changes. As a result, the virtual character 51 appears as if it actually existed on the marker 61 which exists in the real space.

Figure 9:
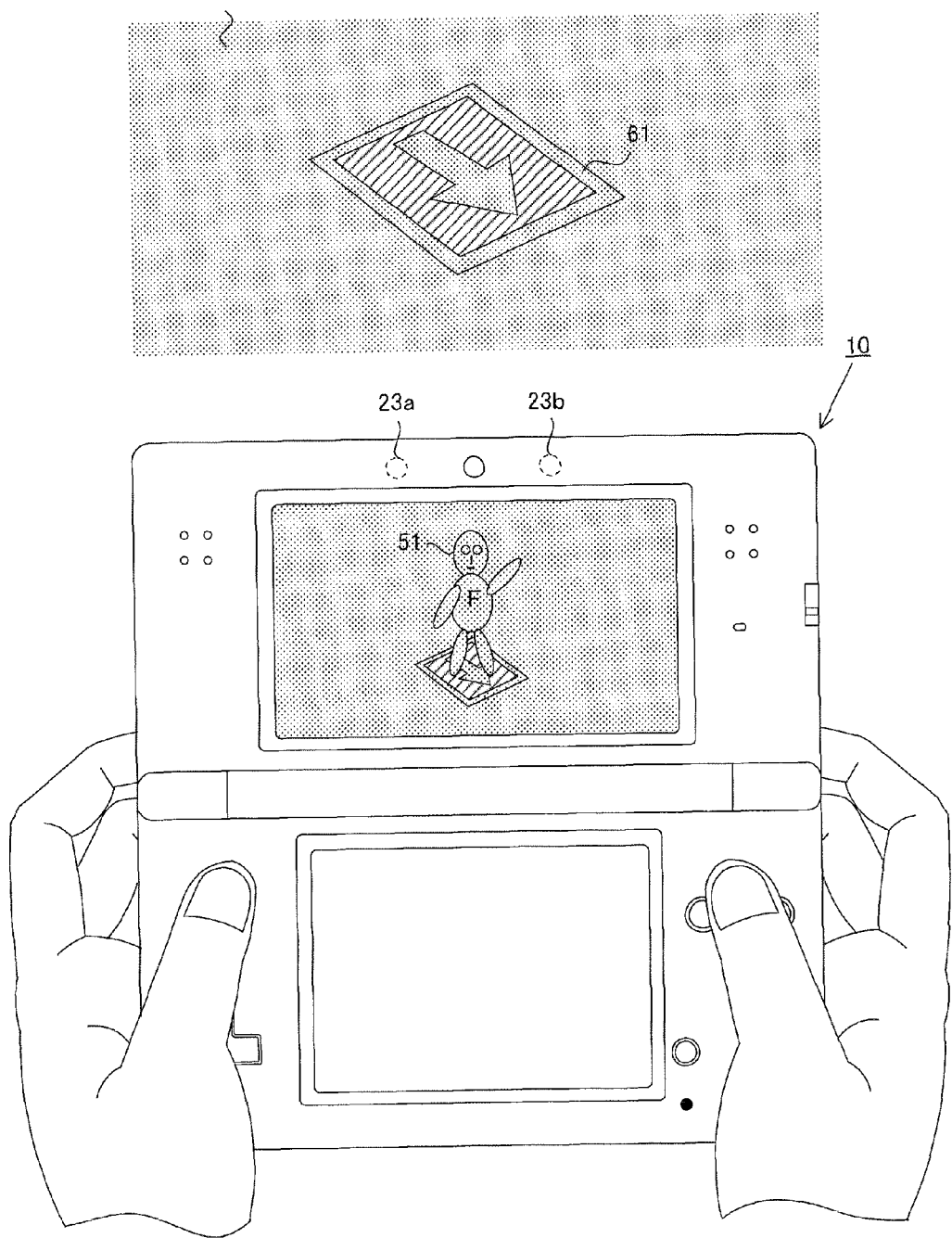
FIG. 9 shows a state where the color and brightness of the virtual character 51 change in accordance with the color and brightness of the real space.

Next, a description is given of the changes that occur to the virtual character 51 in accordance with the color and brightness of the real space. FIG. 9 shows a state where the color and brightness of the virtual character 51 change in accordance with the color and brightness of the real space.

FIG. 9 shows a case where the real space is less bright than the case shown in FIG. 5 (i.e., the brightness of lighting or sunlight in the real space of FIG. 9 is less than that of lighting or sunlight in the real space of FIG. 5). It should be noted that "BACKGROUND OF REAL SPACE" which is shown in a rectangular shape in FIG. 9 is, in reality, not such a rectangular area, but refers to the entirety of real the space in which the game apparatus 10 exists, or refers to a range within which the outer imaging section 23 captures an image. As shown in FIG. 9, if the real space is relatively dark, the brightness of the white-color areas (including the arrow and the periphery) of the marker 61 existing in the real space is low. If the outer imaging section 23 captures an image of the marker 61 under such environment, the entire real image displayed on the upper LCD 22 becomes relatively dark, and also, the virtual character 51 displayed on the upper LCD 22 becomes relatively dark. Moreover, if the color of lighting in the real space is not white but red for example, then the entire real image captured by the outer imaging section 23 becomes a red-tinged image, and also, the entire image of the virtual character 51 becomes a red-tinged image. Thus, the color and brightness of the virtual character 51, which is displayed in a superimposed manner, change in accordance with the color and brightness of the real space.

To be specific, the game apparatus 10 extracts a predetermined sampling point from the real image captured by the outer imaging section 23 (i.e., from one of the real image for left eye and the real image for right eye). Then, the game apparatus 10 obtains color information (RGB value) about the sampling point. Next, setting of a light source provided in the virtual space is determined based on the obtained color information about the sampling point. Then, the virtual character 51 in the virtual space is illuminated by the light source whose setting has been determined based on the obtained color information about the sampling point, and images of the virtual character 51 are captured by the virtual cameras (the left virtual camera 53a and the right virtual camera 53b), respectively.

As described above, the setting of the light source in the virtual space is determined based on the real image. Therefore, in a case where the real space is dark, the virtual character 51 is displayed in a manner to look dark. Similarly, in a case where the real space is bright, the virtual character 51 is displayed in a manner to look bright. Further, in a case where the color of lighting in the real space is in a predetermined color, the virtual character 51 that is tinged with the predetermined color is displayed. Therefore, when the real image and the image of the virtual character 51 are displayed together in a superimposed manner, the virtual character 51 matches well with the real image to allow the user to feel as if the virtual character 51 actually existed in the real space. In other words, if the virtual character 51 is displayed in a manner to look bright when, for example, the real space is dark and the real image is displayed in a manner to look dark, then the image of the virtual character 51 unnaturally stands out. As a result, the user cannot feel as if the virtual character 51 actually existed in the real space. However, according to the present embodiment, the virtual object is displayed with a color and brightness that are similar to those in the real space. Thus, the displayed image looks natural.

(Details of Image Processing)

Figure 10:
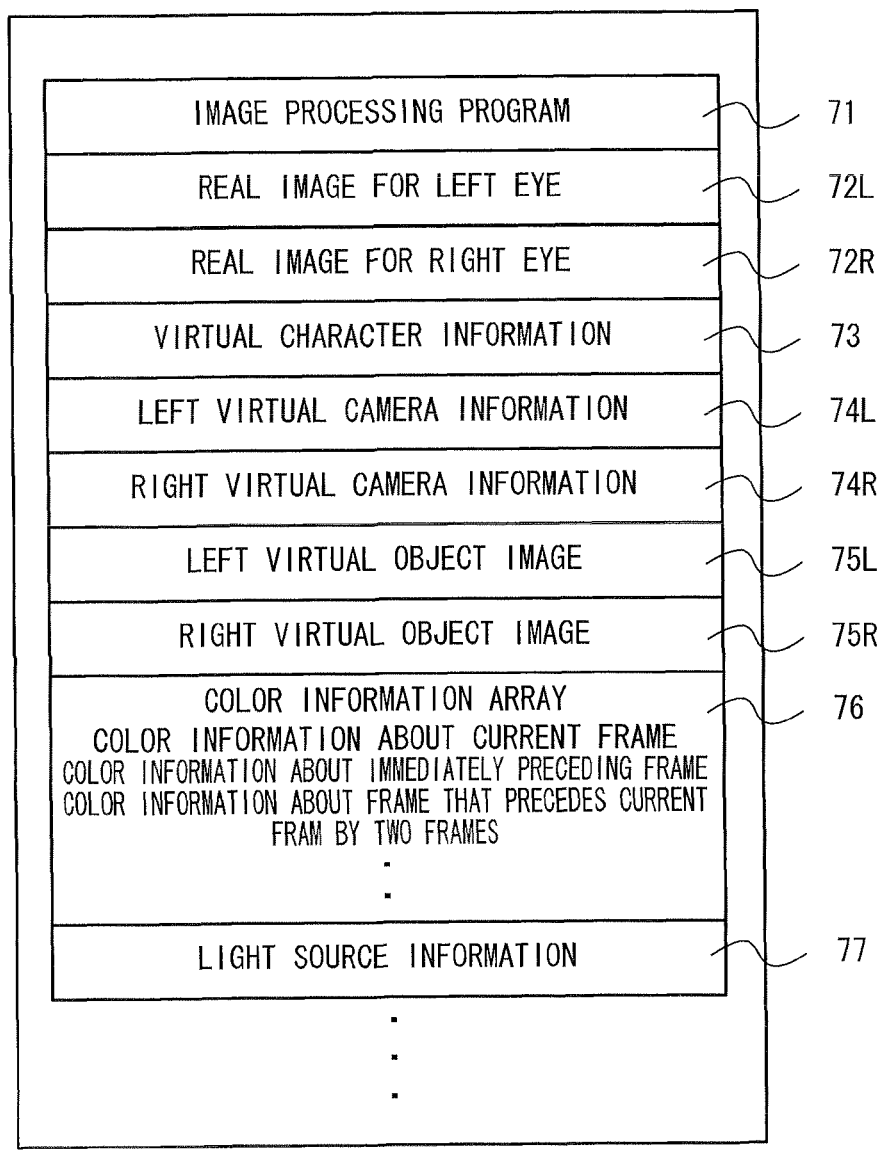
FIG. 10 shows a memory map of a RAM of the game apparatus 10.
Figure 11:
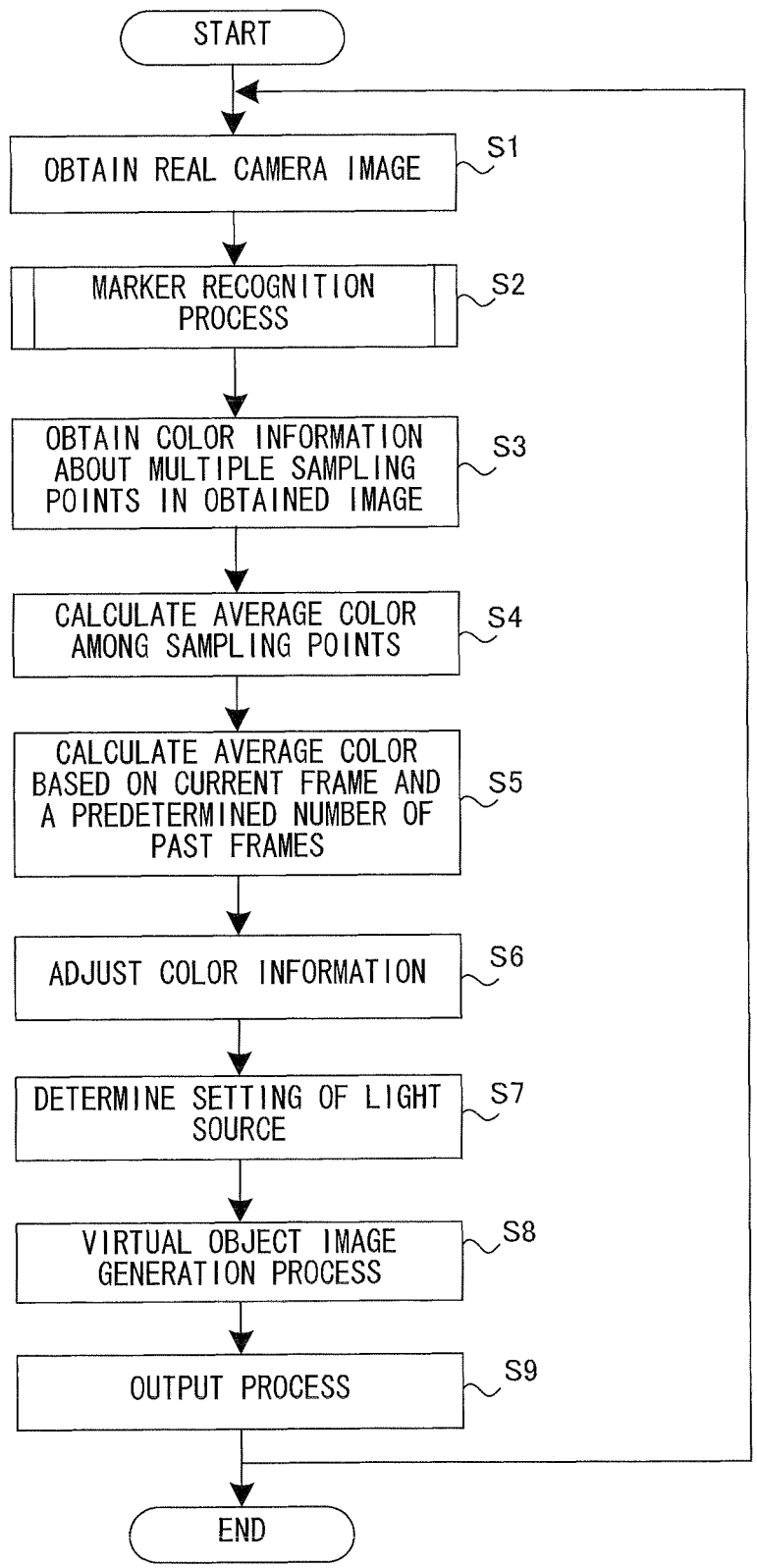
FIG. 11 is a main flowchart that shows the details of image processing according to the embodiment of the present invention.
Figure 12:
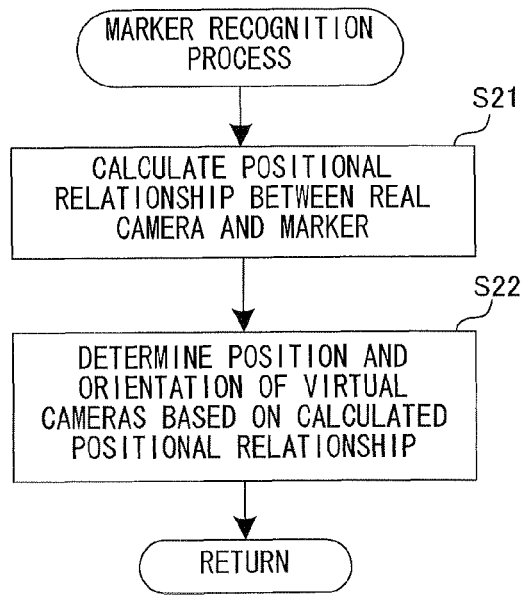
FIG. 12 is a flowchart showing the details of a marker recognition process (step S2)

Next, the details of the image processing according to the present embodiment will be described with reference to FIG. 10 to FIG. 12. First, a description is given of main data that are stored in the main memory 32 and the VRAM 313 (hereinafter, the main memory 32 and the VRAM 313 may be collectively referred to as a "RAM") when the image processing is performed. FIG. 10 shows a memory map of the RAM of the game apparatus 10. As shown in FIG. 10, the RAM stores an image processing program 71, a real image for left eye 72L, a real image for right eye 72R, virtual character information 73, left virtual camera information 74L, right virtual camera information 74R, a left virtual object image 75L, a right virtual object image 75R, color information array 76, light source information 77, and the like.

The image processing program 71 is a program for causing the information processing section 31 (CPU 311) to perform the image processing which is shown in a flowchart described below.

The real image for left eye 72L is an image of a real space that is captured by the outer imaging section (left) 23a.

The real image for right eye 72R is an image of the real space that is captured by the outer imaging section (right) 23b.

The virtual character information 73 is information about the virtual character 51. To be specific, the virtual character information 73 contains: three-dimensional model data that indicates the shape of the virtual character 51 (i.e., polygon data); texture data that indicates the design of the virtual character 51; and information about the position and orientation of the virtual character 51 in the virtual space.

The left virtual camera information 74L indicates the position and orientation of the left virtual camera 53a in the virtual space. Specifically, the left virtual camera information 74L is a matrix that is calculated based on the position and orientation of the marker 61 in the real image for left eye.

The right virtual camera information 74R indicates the position and orientation of the right virtual camera 53b in the virtual space. Specifically, the right virtual camera information 74R is a matrix that is calculated based on the position and orientation of the marker 61 in the real image for right eye.

The left virtual object image 75L is an image of the virtual character 51 that is captured by the left virtual camera 53a.

The right virtual object image 75R is an image of the virtual character 51 that is captured by the right virtual camera 53b.

The color information array 76 is a collection of color information (RGB values) about predetermined sampling points in a real image (the real image for left eye or the real image for right eye). A real image is obtained in each frame (e.g., 1/30 sec or 1/60 sec; hereinafter, referred to as a frame time). Upon obtaining the real image, the game apparatus 10 calculates the aforementioned color information based on the real image. The game apparatus 10 stores pieces of color information calculated in the respective frames in the color information array 76 in a chronological order. That is, pieces of color information that correspond to a predetermined number of past frames, respectively, are contained in the color information array 76.

The light source information 77 is information about parameters of the light source in the virtual space (i.e., a plurality of parameters indicating the color and brightness of the light source).

(Description of Main Flow)

Figure 13:
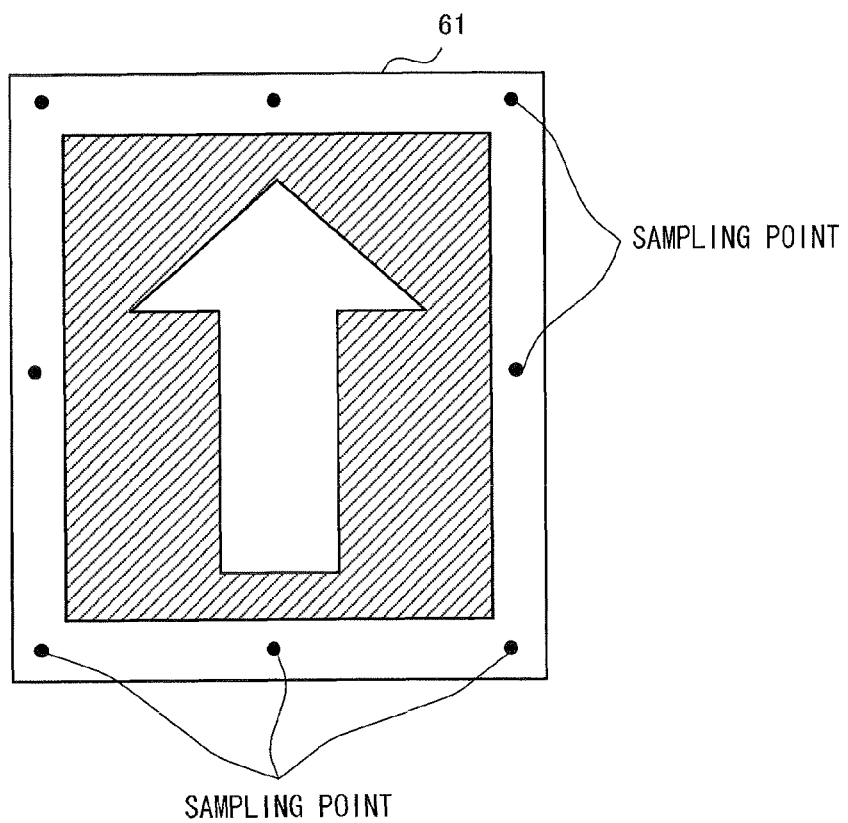
FIG. 13 shows sampling points on the marker 61 in a case where the marker 61 is seen from right above.

Next, the details of the image processing according to the present embodiment will be described with reference to FIG. 11 to FIG. 13. FIG. 11 is a main flowchart that shows the details of the image processing according to the present embodiment. When the game apparatus 10 is powered on, the information processing section 31 (CPU 311) of the game apparatus 10 executes a boot program stored in a ROM (not shown), thereby initializing the respective units such as the main memory 32. Next, the image processing program 71 stored in a nonvolatile memory (such as the external memory 44 which is a computer-readable storage medium) is loaded into the RAM (specifically, the main memory 32). Then, the CPU 311 of the information processing section 31 starts executing the program. Processes shown in the flowchart of FIG. 11 are performed by the information processing section 31 (CPU 311 or GPU 312) after the above boot process is completed. It should be noted that, processes that are not directly related to the present invention are not shown in FIG. 11. Further, a processing loop shown in FIG. 11 from step S1 to step S9 is repeated every frame.

First, at step S1, the information processing section 31 obtains a real camera image. To be specific, the information processing section 31 transmits to the outer imaging section 23 a command to capture an image. In response to the command, the outer imaging section (left) 23a captures a real image for left eye 72L, and the outer imaging section (right) 23b captures a real image for right eye 72R. Then, the information processing section 31 obtains and stores the two captured images (i.e., the real image for left eye 72L and the real image for right eye 72R) into the RAM. Next, the information processing section 31 performs the process at step S2.

At step S2, the information processing section 31 performs a marker recognition process. In the marker recognition process, the marker 61, which is contained in each of the two images, is recognized by using the real image for left eye 72L and the real image for right eye 72R obtained at step S1. In the marker recognition process, in accordance with the result of the recognition of the marker, the virtual cameras (i.e., the left virtual camera 53a and the right virtual camera 53b) are set in the virtual space. The marker recognition process will be described below in detail. After the marker recognition process is performed, the information processing section 31 performs the process at step S3.

At step S3, the information processing section 31 obtains color information about a plurality of sampling points in one of the obtained images. Specifically, the information processing section 31 uses one of the real image for left eye 72L and the real image for right eye 72R to extract all of predetermined sampling points (one or a plurality of pixel points), and obtains color information (RGB values) about the extracted sampling points. Here, as shown in FIG. 13, the sampling points are predetermined points within a white-color area of the marker 61. FIG. 13 shows the sampling points on the marker 61 in a case where the marker 61 is seen from right above. FIG. 13 shows eight sampling points. At step S3, all of these sampling points are extracted, and color information about each sampling point is obtained. It should be noted that the number of sampling points is not limited. For example, the number of sampling points may be one or sixteen. Next, the information processing section 31 performs the process at step S4.

At step S4, the information processing section 31 calculates an average color among the sampling points. Specifically, the information processing section 31 calculates an average color among all the sampling points (i.e., an average RGB value) based on the RGB values of the obtained sampling points, and stores the average color in the color information array 76. Next, the information processing section 31 performs the process at step S5.

At step S5, the information processing section 31 calculates an average color based on the current frame and a predetermined number of past frames. To be specific, the information processing section 31 further calculates an average color (i.e., an RGB value) based on the RGB value currently calculated at the above step S4 and the RGB values previously calculated (and stored in the color information array 76) at step S4 in the predetermined number of past frames (e.g., several tens of frames). Next, the information processing section 31 performs the process at step S6.

At step S6, the information processing section 31 adjusts the color information. Here, the information processing section 31 performs predetermined calculation on the average color (RGB value) calculated at step S5 (e.g., multiply the RGB value by a predetermined value), thereby adjusting the average color calculated at step S5. Next, the information processing section 31 performs the process at step S7.

At step S7, the information processing section 31 determines setting of the light source. To be specific, the information processing section 31 sets parameters of the light source (which is a point light source or parallel light source) in the virtual space based on the color information adjusted at step S6, and stores the parameters in the RAM as the light source information 77). The parameters of the light source are those indicating the color, brightness, etc., of the light source. The parameters include one that uniformly affects the entire screen and one that interacts with the material of the virtual character to affect the display. Next, the information processing section 31 performs the process at step S8.

At step S8, the information processing section 31 performs a virtual object image generation process. Here, the virtual character 51 existing in the virtual space is illuminated by the light source whose setting has been determined at step S7, and images of the virtual character 51 are captured by the left and right virtual cameras, respectively. Specifically, the information processing section 31 causes the left virtual camera 53a to capture an image of the virtual space, thereby generating and storing the left virtual object image 75L in the RAM. Further, the information processing section 31 causes the right virtual camera 53b to capture an image of the virtual space, thereby generating and storing the right virtual object image 75R in the RAM. The parameters of the light source in the virtual space are set as described above based on the calculated average color. If, for example, the calculated average color is a relatively dark color, then the virtual character 51 is displayed in a manner to look dark. Similarly, if the calculated average color is red, the virtual character 51 is displayed in a manner to look red-tinged. Next, the information processing section 31 performs the process at step S9.

At step S9, the information processing section 31 performs an output process. As a result of the output process being performed, a stereoscopically visible image is displayed on the upper LCD 22. To be specific, the information processing section 31 generates a superimposed image in which the virtual object image generated at step S8 is superimposed on the real camera image obtained at step S1. To be more specific, the information processing section 31 generates a superimposed image for left eye in which the left virtual object image 75L is superimposed on the real image for left eye 72L, and generates a superimposed image for right eye in which the right virtual object image 75R is superimposed on the real image for right eye 72R. Then, the information processing section 31 outputs these two generated superimposed images to the upper LCD 22. The superimposed image for left eye displayed on the upper LCD 22 is viewed by the user's left eye through the parallax barrier, and the superimposed image for right eye is viewed by the user's right eye through the parallax barrier. Accordingly, the user can view an image with a stereoscopic effect.

It should be noted that if, at step S2, the marker is not detected in one of (or in any of) the real image for left eye 72L and the real image for right eye 72R, then the process step S9 is performed without the process steps S3 to S8 being performed. In this case, at step S9, a message indicating that the marker has not been detected is superimposed on the left and right real images obtained at step S1, and the resultant images are displayed on the upper LCD 22.

(Description of Marker Recognition Process)

Next, the marker recognition process will be described in detail. FIG. 12 is a flowchart showing the details of the marker recognition process (step S2).

At step S21, the information processing section 31 calculates a positional relationship between the real camera and the marker. To be specific, first, the information processing section 31 determines by means of pattern matching or the like whether the marker is contained in the real image for left eye 72L. If the marker is contained in the real image for left eye 72L, the information processing section 31 calculates a positional relationship between the outer imaging section (left) 23a and the marker 61 existing in the real space based on the position, size, and shape of the marker, the direction indicated by the arrow of the marker, etc., in the real image for left eye 72L. Here, the positional relationship between the outer imaging section (left) 23a and the marker 61 is indicated as the three-dimensional position and orientation of one of the marker 61 and the outer imaging section (left) 23a in relation to the other of the marker 61 and the outer imaging section (left) 23a. Specifically, the positional relationship is the relative position and orientation of the outer imaging section (left) 23a in relation to the marker 61. In a similar manner, the information processing section 31 calculates a positional relationship between the outer imaging section (right) 23b and the marker 61 existing in the real space, by using the real image for right eye 72R. Here, the relative position and orientation of the outer imaging section (left) 23a in relation to the marker 61, and the relative position and orientation of the outer imaging section (right) 23b in relation to the marker 61, are each calculated as a matrix.

To be more specific, at step S21, a marker coordinate system is set based on the result of recognition of the marker, and also, the positional relationship between the marker 61 and the outer imaging section (left) 23a is calculated (see FIG. 7). The origin of the marker coordinate system is set to be the center of the marker 61. The Z-axis of the marker coordinate system is set to be parallel to the direction indicated by the arrow of the marker 61 (i.e., parallel to the longer sides of the marker 61); the X-axis of the marker coordinate system is set to be parallel to the shorter sides of the marker 61 and extends to the right with respect to the direction indicated by the arrow of the marker; and the Y-axis of the marker coordinate system is set to extend upward perpendicularly to the marker 61 (i.e., extend upward in a direction normal to the rectangular marker 61). The marker coordinate system defines the virtual space. Correspondence between the real space and the virtual space is made based on the marker coordinate system. That is, the origin of the marker coordinate system is the origin of the virtual space and is the center of the marker 61 in the real space.

The relative position and orientation of the outer imaging section (left) 23a in relation to the marker 61 are calculated as a matrix. Similarly, the relative position and orientation of the outer imaging section (right) 23b in relation to the marker 61 are calculated as a matrix. The outer imaging section (left) 23a and the outer imaging section (right) 23b are arranged such that the image capturing directions of the respective outer imaging sections are parallel to each other and such that the outer imaging section (left) 23a and the outer imaging section (right) 23b do not rotate with respect to their image capturing directions. That is, the orientation of the outer imaging section (left) 23a and the orientation of the outer imaging section (right) 23b always coincide with each other. Further, the outer imaging section (left) 23a and the outer imaging section (right) 23b are arranged to have a predetermined distance therebetween. Accordingly, for example, if the position and orientation of the outer imaging section (left) 23a are calculated based on the real image for left eye 72L, then the position and orientation of the outer imaging section (right) 23b can be calculated even without using the real image for right eye 72R. After step S21, the information processing section 31 performs a process at the next step S22.

At step S22, the information processing section 31 determines the position and orientation of the left and right virtual cameras. Here, the position and orientation of the left and right virtual cameras coincide with the position and orientation of the outer imaging section 23. Specifically, the position and orientation of the left virtual camera 53a in the virtual space are set to coincide with the position and orientation of the outer imaging section (left) 23a. Similarly, the position and orientation of the right virtual camera 53b in the virtual space are set to coincide with the position and orientation of the outer imaging section (right) 23b. To be more specific, the position and orientation of the left virtual camera 53a are represented as a matrix (i.e., left view matrix). The matrix representing the position and orientation of the outer imaging section (left) 23a, which is calculated at step S21, is stored in the RAM as the left virtual camera information 74L. Similarly, the position and orientation of the right virtual camera 53b are represented as a matrix (i.e., right view matrix). The matrix representing the position and orientation of the outer imaging section (right) 23b, which is calculated at step S21, is stored in the RAM as the right virtual camera information 74R. It should be noted that, as described above, the orientation of the outer imaging section (left) 23a and the orientation of the outer imaging section (right) 23b always coincide with each other, and therefore, the orientation of the left virtual camera 53a and the orientation of the right virtual camera 53b also coincide with each other.

As described above, in the present embodiment, color information about predetermined points in the real image is obtained. Based on the obtained color information, parameters of the light source in the virtual space (i.e., parameters relating to the color or brightness of the light source) are set. The light source whose parameters have been set in such a manner illuminates the virtual character, and the virtual camera (i.e., the left and right virtual cameras 53a and 53b; hereinafter, these virtual cameras may be collectively referred to as "the virtual camera") captures an image of the virtual character. The image of the virtual character captured by the virtual camera is superimposed on a real image, and the resultant image is displayed. Accordingly, the display of the virtual character changes in accordance with the environment of the real space. Consequently, the displayed virtual character looks natural. Further, the virtual space is set to correspond to the real space, and the position and orientation of the virtual camera are set to coincide with those of the real camera (i.e., the outer imaging section 23). This allows the user to feel as if the virtual character existing in the virtual space actually existed in the real space.

Further, in the present embodiment, points in the white-color area of the marker 61 are extracted as sampling points, and color information about the sampling points is obtained. In this manner, the color and brightness in the real environment can be recognized accurately. Assume a case where color information is obtained regarding a specific target object other than the marker 61. In this case, it is difficult to determine what color of light is illuminating the specific target object unless the original color of the specific target object (i.e., the color of the object at the time when being illuminated by white color light) is known. In the present embodiment, color information about an area of a known color, particularly, color information about the white-color area, is obtained. Accordingly, the color and brightness of light illuminating the white-color area can be known accurately.

Still further, in the present embodiment, color information about a plurality of sampling points is obtained and an average color is calculated based on the obtained color information. Accordingly, even in a case where another object exists on a part of the marker 61, or a case where a specific type of light illuminates a part of the marker 61, influences of these factors at the time of obtaining information about the light in the real environment can be reduced. For example, in the case of extracting only one point on the marker 61, if the user's finger is placed over the point, or if colored light is only illuminating the point (or the vicinity of the point), then the display of the virtual character becomes unnatural since the setting of the virtual light source is determined based on color information obtained regarding the point. However, in the present embodiment, multiple points are extracted and an average color among the multiple points is calculated. This prevents the display from becoming unnatural.

Still further, in the present embodiment, an average color is calculated based on color information calculated in the current frame and color information calculated in a predetermined number of past frames. Then, the setting of the light source is determined based on the calculated average color. Therefore, even if the color information calculated in the current frame indicates a sudden significant change in color, the color and brightness of the displayed virtual character do not show a sudden significant change. This also reduces influences of errors or erroneous marker recognition, thereby realizing a natural display.

Still further, in the present embodiment, the virtual character 51 is placed near the sampling points and then displayed. Assume a case where the display position of the virtual character and the position of the sampling points are not in close proximity to each other. In such a case, if in the real environment a spotlight illuminates the display position of the virtual character but does not illuminate the sampling points, then the virtual character is displayed in a manner to look dark. Accordingly, the display becomes unnatural. However, in the present embodiment, points in the real space that are in close proximity to the display position of the virtual character are extracted as sampling points. This prevents the display from becoming unnatural.

(Variations)

In the present embodiment, a virtual character resembling a human being is placed in the virtual space as a virtual object. In another embodiment, the virtual object may be any object, for example, an object resembling an animal, an object resembling a plant, a robot object, etc.

Further, in the present embodiment, for the purpose of displaying a stereoscopically visible image, left and right real images are obtained by the outer imaging section 23 (i.e., the real camera), and left and right images are also obtained by the virtual camera. In another embodiment, a single image captured by the virtual camera may be superimposed on a single real image captured by the real camera, and the resultant planar image may be displayed.

Still further, in the present embodiment, based on the recognition of the marker 61, the virtual space corresponding to the real space is set (i.e., the marker coordinate system is set on the marker 61), and the virtual camera is set such that the position and orientation of the virtual camera coincide with those of the real camera (i.e., the outer imaging section 23). This allows the user to feel as if the virtual object placed in the virtual space actually existed in the real space (i.e., augmented reality). In another embodiment, the virtual object may be simply superimposed on the real image captured by the real camera, and the resultant image may be displayed. In other words, in another embodiment, it is not essential to set the virtual space to correspond to the real space. A natural display in which an image of the virtual object matches well with a real image is realized in the following manner: extract a part of the real image captured by the real camera to obtain color information; determine the setting of the virtual light source based on the obtained color information; and superimpose on the real image the virtual object illuminated by the light source and display the resultant image.

Still further, in the present embodiment, the virtual space is set by using the marker 61, and color information is obtained by extracting predetermined points on the marker 61. Alternatively, in another embodiment, color information may be obtained by extracting predetermined points on a specific target object different from the marker 61. In other words, the marker used for setting the virtual space may be different from the specific target object used for obtaining color information.

Still further, in the present embodiment, points in the white-color area of the marker 61 contained in the real image are extracted as sampling points, and color information about the sampling points is obtained. Alternatively, in another embodiment, an area entirely colored with a predetermined color may be extracted from the marker 61 to obtain color information. Still alternatively, in another embodiment, color information may be obtained by extracting at least one pixel in any area (different from the marker) in the real image. For example, assume a case where the outer imaging section 23 captures an image of a piece of paper of a predetermined color that is placed in the real space, and a virtual object is displayed to be shown on the piece of paper. In such a case, even if the lighting in the real space is white lighting, the display may look natural when the virtual object is displayed in a similar color to that of the piece of paper.

Still further, in the present embodiment, color information about multiple sampling points is obtained; an average color among the sampling points is calculated; and parameters relating to the color of the virtual light source are set based on the average color (the parameters including those indicating the color and brightness of the virtual light source). In another embodiment, multiple sampling points may be extracted, and, for example, color information about the sampling point that has the highest brightness may be obtained. Then, the setting of the virtual light source may be determined based on the obtained color information. That is, the setting of the virtual light source may be determined based on, for example, the color information about the brightest area in the real image captured by the real camera.

Still further, in the present embodiment, the parameters of the virtual light source (the parameters relating to the color and brightness of the virtual light source) are set based on color information about predetermined points in the real image. Alternatively, in another embodiment, not only the parameters relating to the color and brightness of the virtual light source but also the position, type, etc., of the virtual light source may be set based on the color information about the real image. For example, if there is a particular bright area in an image captured by the real camera, it can be assumed that a spotlight is illuminating the area from a predetermined direction. Further, the direction from which the spotlight is illuminating the area can be estimated based on the shape of the area (e.g., if the shape of the bright area in the real space is circular, it can be estimated that the spotlight is illuminating the area from right above, and if the shape of the bright area in the real space is ellipsoidal, it can be estimated that the spotlight is obliquely illuminating the area). Further, for example, if a captured real image shows a solid object near the marker 61, then the position of the lighting in the real space (i.e., the direction from which the light is emitted) can be estimated based on the size of the object and the size of the shadow casted by the object. That is, the position, type, color, brightness, etc., of the virtual light source may be set based on color information that is obtained regarding pixels in the real image captured by the real camera.

Still further, in the present embodiment, an average color is calculated based on color information calculated in the current frame and color information calculated in a predetermined number of past frames. The parameters of the light source are set based on the average color. Alternatively, in another embodiment, the parameters of the light source may be set based on color information calculated in the current frame and color information calculated in a predetermined number of past frames. In other words, it is not essential to calculate an average color based on color information calculated in the current frame and color information calculated in past frames. For example, color information calculated in the current frame may be compared with color information calculated in a predetermined number of past frames, and if the difference therebetween is less than a predetermined threshold, the parameters of the light source may be set by using the color information calculated in the current frame. Alternatively, predetermined calculation (e.g., weighted average) may be performed by using color information calculated in the current frame and color information calculated in a predetermined number of past frames, and the parameters of the light source may be set based on the calculation result.

Still further, in the present embodiment, color information is obtained by using one of the real image for left eye and the real image for right eye. Alternatively, in another embodiment, color information may be obtained by using both the real image for left eye and the real image for right eye. For example, the setting of the virtual light source may be determined by using the real image for left eye, and the left virtual camera may capture an image of the virtual object that is illuminated by the virtual light source whose setting has been determined by using the real image for left eye. Also, the setting of the virtual light source may be determined by using the real image for right eye, and the right virtual camera may capture an image of the virtual object that is illuminated by the virtual light source whose setting has been determined by using the real image for right eye.

Still further, in the present embodiment, an RGB value is obtained as color information. Alternatively, color information to be obtained may only be brightness. For example, the maximum brightness may be obtained from an RGB value. In the present embodiment, the color and brightness of the virtual light source are set. Alternatively, in another embodiment, the color of the virtual light source may be fixed (e.g., white) and only the brightness of the virtual light source may be set.

Still further, in the present embodiment, the color, brightness, etc., of the light in the real space are estimated based on a real image captured by the real camera (i.e., the outer imaging section 23). Based on the estimation, the color, brightness, etc., of the virtual light source are set. Alternatively, in another embodiment, information about the lighting environment (e.g., the color and brightness) in the real space may be obtained by other means (e.g., a light sensor). Then, the setting of the virtual light source may be determined based on the obtained information. That is, information about the color and brightness of the real space may be obtained either based on a real image as described above or based on a result of detection by detection means such as a light sensor.

Still further, in the present embodiment, the positional relationship between the outer imaging section 23 and the marker 61 (i.e., a relative position and a relative orientation) is calculated by capturing an image of the marker 61 by the outer imaging section 23. Then, the virtual space (i.e., the marker coordinate system) is defined based on the calculated positional relationship. Alternatively, in another embodiment, the positional relationship may be calculated by recognizing not the marker 61 but another object in the captured image. For example, a predetermined object existing in the real space (e.g., a chair, table, or the like existing in the real space) may be detected through image recognition such as pattern matching. Then, the positional relationship between the outer imaging section 23 and the predetermined object may be calculated, and the virtual space may be defined based on the calculated positional relationship. That is, in another embodiment, a specific target object existing in the real space (e.g., the marker or any predetermined object) may be recognized from the captured image, and the positional relationship between the specific target object and the outer imaging section 23 may be calculated. Still alternatively, the specific target object may be recognized not based on an image captured by the real camera but by other recognition means (e.g., an ultrasonic sensor).

In another embodiment, the position and orientation of the real camera may be detected by means of a GPS, an acceleration sensor, an angular velocity sensor, a geomagnetic sensor, or the like. Based on the detected position and orientation, the position and orientation of the virtual camera in the virtual space may be set, and an image of the virtual space that is captured by the virtual camera may be superimposed on an image captured by the real camera. For example, a virtual object may be placed at a predetermined position in the virtual space which corresponds to the real space, and the real camera may capture, from a predetermined direction, an image of a position in the real space, which position corresponds to the predetermined position in the virtual space. In this case, the position and orientation of the real camera may be detected by a GPS or orientation detection means (e.g., an acceleration sensor, angular velocity sensor, or geomagnetic sensor), and the virtual camera may be set in the virtual space such that the position and orientation of the virtual camera coincide with the position and orientation of the real camera. An image captured by the virtual camera may be superimposed on the image captured by the real camera. This allows a picture to be taken, in which the virtual object looks as if it actually existed in the position in the real space, which position corresponds to the predetermined position in the virtual space.

In the present embodiment, augmented reality is realized by means of video see-through. To be specific, in the present embodiment, superimposed images are generated by superimposing the images captured by the virtual camera (specifically, captured by the left and right virtual cameras) on the images captured by the outer imaging section 23. The superimposed images are displayed on the upper LCD 22. Alternatively, in another embodiment, augmented reality may be realized by means of optical see-through. For example, the user may wear a head-mounted display device that includes a camera for detecting the marker placed in the real space. Here, the user can view the real space through an eyeglass-lens-like display unit. The display unit is formed from a material that has transparency such that the user's eyes can directly view the real space. The display unit includes a liquid crystal display or the like. The liquid crystal display or the like can display an image of a virtual object that is generated by a computer, and light from the liquid crystal display is reflected by a half mirror or the like and thereby guided to reach the user's retina. That is, the display unit can act as a display screen that displays a captured image of the virtual object, or act as eyeglass lenses that have such transparency that the real space can be viewed therethrough. This allows the user to view an image of the real space on which an image of the virtual object is superimposed. Thus, an image of the virtual object that is captured by the virtual camera may be superimposed on the real space which is viewed through the lenses, or an image of the virtual object that is captured by the virtual camera may be superimposed on a real image of the real space that is captured by the real camera. That is, the virtual object may be displayed so that the user can view the virtual object in a state of being superimposed on the real space visible on the screen (i.e., the real space shown in the real image displayed on the screen, or the real space viewed through the screen). The camera included in the head-mounted display device is used for determining the setting of the virtual light source, and an image of the virtual object is generated in accordance with the setting of the light source.

In another embodiment, the above-described image processing method may be applied not only to a game apparatus but also to any other electronic apparatuses, for example, a PDA (Personal Digital Assistant), sophisticated mobile phone, camera (camera as a device), etc.

In the present embodiment, an LCD capable of displaying an image that is stereoscopically visible with naked eyes is used as a display device. Alternatively, in another embodiment, the present invention is applicable to a case where stereoscopic display is performed by using glasses of time-division type, or polarization glasses, or anaglyph glasses (red cyan glasses).

In another embodiment, an image processing system that realizes the above-described image processing method may be constructed, in which system the processing is distributed to a plurality of information processing apparatuses that are communicably connected to each other by means of wired or wireless communication. For example, the outer imaging section 23 of an information processing apparatus may be provided separately from the information processing apparatus, and the outer imaging section 23 may be connected, for example, wirelessly, to the information processing apparatus. Moreover, the display device of the information processing apparatus may be provided separately from the information processing apparatus, and the display device and the information processing apparatus may be connected to each other. Furthermore, the position and orientation of the outer imaging section 23 may be detected by detection means that is provided separately from the information processing apparatus, and the detection result may be transmitted to the information processing apparatus.

In the above embodiment, the information processing section 31 of the game apparatus 10 performs the processing according to the above-described flowcharts by executing a predetermined program. Alternatively, in another embodiment, a part or the entirety of the processing may be performed by dedicated circuitry included in the game apparatus 10.

The above-described image processing program may be stored not in the above-described memory but in a computer-readable storage medium such as an optical disc, magnetic disc, etc., and the image processing program may be provided to the game apparatus 10 via the computer-readable storage medium. Alternatively, for example, the above-described image processing program may be stored in a RAM of a server on a network. Then, the image processing program may be provided to the game apparatus 10 through connection of the game apparatus 10 to the network.

While the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein an image processing program executable by a computer of an image processing apparatus, which is connected to a real camera for capturing an image of a real space and a display device including a screen on which the real space is displayed, to cause the image processing apparatus to perform operations, comprising:
   obtaining a real image showing the real space that is captured by the real camera;
   detecting a specific target object within the real image whose color is known;
   obtaining color information about at least one pixel of the specific target object the real image, wherein obtained information includes color information about at least one pixel of a portion of the specific target object that has a higher brightness than that of other portions of the specific target object;
   setting, based on the color information obtained, at least one light source parameter relating to a color and/or a brightness of a virtual light source set in a virtual space;
   generating a virtual object image that is obtained when an image of a virtual object in the virtual space, which virtual object is illuminated by the virtual light source whose at least one light source parameter is set, is captured by the virtual camera; and
   displaying the virtual object image in a manner such that the virtual object image is superimposed on the real space displayed on the screen.

2. The non-transitory computer-readable storage medium having the image processing program stored therein, according to claim 1, wherein
   obtaining color information further includes obtaining color information about a plurality of points in the image that corresponds to the specific target object and calculating an average value based on the obtained color information, and wherein
   the at least one light source parameter is set based on the average value.

3. The non-transitory computer-readable storage medium having the image processing program stored therein, according to claim 1, wherein
   the virtual object image is displayed such that the virtual object is shown to be on or near the specific target object.

4. The non-transitory computer-readable storage medium having the image processing program stored therein, according to claim 1, further causing the image processing apparatus to perform operations including:
   obtaining real camera position and orientation information which corresponds to a position and an orientation of the real camera in the real space; and
   setting a virtual camera position and orientation of the virtual camera in the virtual space, that correspond to the real camera position and orientation information, and wherein
   generating a virtual object image further includes capturing, with the virtual camera whose position and orientation are set, an image of the virtual object which is illuminated by the virtual light source whose at least one light source parameter is set.

5. The non-transitory computer-readable storage medium having the image processing program stored therein, according to claim 1, further causing the image processing apparatus to perform operations including:
   calculating a target object relative position and a target object relative orientation of one of one or more specific target object and the real camera in relation to a second specific target object and the real camera; and
   setting a virtual camera position and orientation of the virtual camera in the virtual space in accordance with a result of calculating target object relative position and orientation, wherein
   generating a virtual object image further includes capturing, with the virtual camera whose position and orientation are set, an image of the virtual object which is illuminated by the virtual light source whose at least one light source parameter is set.

6. The non-transitory computer-readable storage medium having the image processing program stored therein, according to claim 1, further causing the image processing apparatus to store obtained color information, wherein
   obtained color information comprises past color information that was previously obtained or stored and current color information that was currently obtained, and wherein
   the at least one light source parameter is set based on the past color information and the current color information.

7. The non-transitory computer-readable storage medium having the image processing program stored therein, according to claim 6, wherein
   obtaining color information further includes calculating an average color value based on the past color information and the current color information, and wherein
   the at least one light source parameter is set based on the average color value.

8. The non-transitory computer-readable storage medium having the image processing program stored therein, according to claim 1, wherein the virtual object generated is displayed in a manner such that the virtual object image is superimposed on an image of real space concurrently being captured and displayed on the screen.

9. A non-transitory computer-readable storage medium having stored therein an image processing program executable by a computer of an image processing apparatus, which is connected to a real camera for capturing an image of a real space and a display device including a screen on which the image of the real space is visible, to cause the image processing apparatus to perform operations, comprising:
   obtaining a real image showing the real space that is captured by the real camera;
   detecting a specific target object within the real image whose color is known;
   obtaining environment information about a color and/or a brightness of the specific target object within the real space, wherein obtained information includes information about at least one pixel of a portion of the specific target object that has a higher brightness than that of other portions of the specific target object;
   setting, based on the environment information obtained, at least one light source parameter relating to a color and/or a brightness of a virtual light source placed in a virtual space;
   generating a virtual object image that is obtained when an image of a virtual object in the virtual space, which virtual object is illuminated by the light source whose at least one parameter is set, is captured by the virtual camera; and
   displaying the virtual object image, such that the virtual object image is superimposed on the real space visible on the screen.

10. An image processing apparatus, which is connected to a real camera for capturing an image of a real space and a display device including a screen on which the image of the real space is displayable, comprising:
- real image information acquirer that obtains pixel information of an image of real space that is captured by the real camera;
- target object detector that detects a specific target object whose color is known within the image of real space;
- pixel color information determiner that obtains color information about at least one pixel of the specific target object within the image of real space, wherein obtained information includes color information about at least one pixel of a portion of the specific target object that has a higher brightness than that of other portions of the specific target object;
- light source parameter setter that sets, based on the color information, at least one light source parameter relating to a color and/or a brightness of a virtual light source placed in a virtual space;
- object image generator that generates a virtual object image that is obtained when an image of a virtual object in the virtual space, which virtual object is illuminated by the virtual light source whose at least one parameter is set, is captured by the virtual camera; and
- display controller that displays the object image, such that the virtual object image is superimposed on the real space visible on the screen.

11. An information processing system comprising:
- a real camera for capturing an image of a real space;
- a display device including a screen on which the image of the real space is visible;
- real image obtainer that obtains a real image of the real space that is captured by the real camera;
- target object detector that detects a specific target object whose color is known within the real image;
- color information acquirer that obtains color information about at least one pixel of the specific target object within the real image, wherein obtained information includes color information about at least one pixel of a portion of the specific target object that has a higher brightness than that of other portions of the specific target object;
- light source parameter setter that sets, based on the color information obtained by the color information obtaining acquirer, at least one light source parameter relating to a color and/or a brightness of a virtual light source placed in a virtual space;
- object image generator that generates a virtual object image that is obtained when a virtual image of an object in the virtual space, which object is illuminated by the virtual light source whose at least one parameter is set, is captured by the virtual camera; and
- display controller that displays the object image, such that the virtual object image is superimposed on the real space visible on the screen.

12. A computer implemented image processing method for causing a display device having one or more computer processor and a screen on which an image of a real space is displayed, to display an image of a virtual object, the image processing method comprising:
- obtaining a real image showing the real space that is captured by the real camera;
- detecting a specific target object within the real image whose color is known;
- obtaining pixel color information about at least one pixel of the specific target object within the real image, wherein obtained information includes color information about at least one pixel of a portion of the specific target object that has a higher brightness than that of other portions of the specific target object;
- setting at least one light source parameter based on the pixel color information, the at least one light source parameter relating to a color and/or a brightness of a virtual light source placed in a virtual space;
- generating, using the one or more computer processor, a virtual object image that is obtained when an image of a virtual object in the virtual space, which virtual object is illuminated by the virtual light source whose at least one light source parameter is set, is captured by the virtual camera; and
- displaying the generated virtual object image on the screen, such that the generated virtual object image is superimposed on the real space displayed on the screen.

* * * * *